US007272456B2

(12) United States Patent
Farchmin et al.

(10) Patent No.: US 7,272,456 B2
(45) Date of Patent: Sep. 18, 2007

(54) POSITION BASED MACHINE CONTROL IN AN INDUSTRIAL AUTOMATION ENVIRONMENT

(75) Inventors: David W. Farchmin, Grafton, WI (US); David D. Brandt, Milwaukee, WI (US); David Alan Vasko, Macedonia, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 786 days.

(21) Appl. No.: 10/351,572

(22) Filed: Jan. 24, 2003

(65) Prior Publication Data

US 2004/0148039 A1 Jul. 29, 2004

(51) Int. Cl.
| | |
|---|---|
| G05B 19/18 | (2006.01) |
| G05B 15/02 | (2006.01) |
| G05B 11/01 | (2006.01) |
| H04Q 7/20 | (2006.01) |
| G06F 3/00 | (2006.01) |

(52) U.S. Cl. ............................. 700/66; 700/9; 700/17; 455/456.1; 715/864

(58) Field of Classification Search ............. 455/456.2, 455/404.2, 456.1; 700/9, 17, 65, 66, 23, 700/79; 702/94, 95; 715/700, 864; 340/5.62; 709/208
See application file for complete search history.

(56) References Cited

U.S. PATENT DOCUMENTS

| 3,812,947 A | 5/1974 | Nygaard |
| 4,309,600 A | 1/1982 | Perry et al. |
| 4,518,958 A | 5/1985 | Cook et al. |
| 4,598,275 A | 7/1986 | Ross et al. |
| 4,612,620 A | 9/1986 | Davis et al. |
| 4,700,197 A | 10/1987 | Milne |
| 4,728,959 A | 3/1988 | Maloney et al. |
| 4,742,470 A | 5/1988 | Juengel |
| 4,803,039 A | 2/1989 | Impink, Jr. et al. |
| 5,119,104 A | 6/1992 | Heller |
| 5,119,401 A | 6/1992 | Tsujimoto |

(Continued)

FOREIGN PATENT DOCUMENTS

| DE | 39 32 375 A1 | 9/1988 |
| DE | 38 32 375 A1 | 3/1990 |
| DE | 3832375 A1 | 3/1990 |
| DE | 44 42 443 A1 | 6/1996 |
| DE | 20010529 U1 | 11/2000 |
| DE | 19955646 A1 | 6/2001 |
| DE | 101 42 279 | 3/2003 |

(Continued)

OTHER PUBLICATIONS

A Statistical Modeling Approach to Location Estimation; IEEE Transactions on Mobile Computing; vol. 1, No. 1, Jan.-Mar. 2002; p. 59-69; Roos, et al.

(Continued)

Primary Examiner—Anthony Knight
Assistant Examiner—Jennifer L. Norton
(74) Attorney, Agent, or Firm—Quarles & Brady LLP; Alexander M. Gerasimow

(57) ABSTRACT

A method and apparatus for controlling machine operations in an automated industrial facility including at least one machine, the method for restricting machine operation when a wireless information device associated with a facility user is within a restricted facility location and comprising the steps providing at least one wireless information device, determining if the at least one wireless information device is within a restricted facility location and, where the at least one wireless information device is within a restricted facility location, regulating operation of the at least one machine.

131 Claims, 17 Drawing Sheets

U.S. PATENT DOCUMENTS

| | | |
|---|---|---|
| 5,121,331 A | 6/1992 | Lovrenich |
| 5,202,929 A | 4/1993 | Lemelson |
| 5,287,266 A | 2/1994 | Malec et al. |
| 5,347,463 A | 9/1994 | Nakamura |
| 5,432,702 A | 7/1995 | Barnett |
| 5,485,634 A | 1/1996 | Weiser et al. |
| 5,519,878 A | 5/1996 | Dolin, Jr. |
| 5,544,321 A | 8/1996 | Theimer et al. |
| 5,548,660 A | 8/1996 | Lemelson |
| 5,552,806 A | 9/1996 | Lenchik |
| 5,555,376 A | 9/1996 | Theimer et al. |
| 5,598,572 A | 1/1997 | Tanikoshi et al. |
| 5,627,549 A | 5/1997 | Park |
| 5,642,303 A | 6/1997 | Small et al. |
| 5,642,353 A | 6/1997 | Roy, III et al. |
| 5,649,300 A | 7/1997 | Snyder et al. |
| 5,689,094 A | 11/1997 | Friedli et al. |
| 5,751,221 A | 5/1998 | Stanfield et al. |
| 5,825,759 A | 10/1998 | Liu |
| 5,835,061 A | 11/1998 | Stewart |
| 5,907,491 A | 5/1999 | Canada et al. |
| 5,910,799 A | 6/1999 | Carpenter et al. |
| 5,956,465 A | 9/1999 | Takagi et al. |
| 5,960,085 A | 9/1999 | de la Huerga |
| 5,960,341 A | 9/1999 | LeBlanc et al. |
| 5,978,753 A | 11/1999 | Eidson |
| 5,991,284 A | 11/1999 | Willenegger et al. |
| 6,011,487 A | 1/2000 | Plocher |
| 6,026,304 A | 2/2000 | Hilsenrath et al. |
| 6,060,993 A | 5/2000 | Cohen |
| 6,157,368 A | 12/2000 | Fager |
| 6,167,464 A | 12/2000 | Kretschmann |
| 6,211,799 B1 | 4/2001 | Post et al. |
| 6,236,335 B1 | 5/2001 | Goodwin, III |
| 6,252,867 B1 | 6/2001 | Pfeil et al. |
| 6,282,455 B1 | 8/2001 | Engdahl |
| 6,321,092 B1 | 11/2001 | Fitch et al. |
| 6,347,229 B1 | 2/2002 | Zelmanovich et al. |
| 6,359,711 B1 | 3/2002 | Cole et al. |
| 6,362,783 B1 | 3/2002 | Sugiura et al. |
| 6,381,502 B1 | 4/2002 | Rudder et al. |
| 6,407,719 B1 | 6/2002 | Ohira et al. |
| 6,418,352 B1 | 7/2002 | Ellis et al. |
| 6,437,740 B1 | 8/2002 | De Champlain et al. |
| 6,446,004 B1 | 9/2002 | Cao et al. |
| 6,453,168 B1 | 9/2002 | McCrady et al. |
| 6,453,210 B1 | 9/2002 | Belotserkovskiy et al. |
| 6,496,775 B2 | 12/2002 | McDonald, Jr. et al. |
| 6,507,762 B1 | 1/2003 | Amro et al. |
| 6,516,239 B1 | 2/2003 | Madden et al. |
| 6,546,304 B2 | 4/2003 | Thorvaldsson et al. |
| 6,574,549 B2 | 6/2003 | Cato et al. |
| 6,600,476 B2 | 7/2003 | Mathis et al. |
| 6,611,755 B1 | 8/2003 | Coffee et al. |
| 6,615,094 B2 | 9/2003 | Gleis |
| 6,694,211 B2 | 2/2004 | Hosel |
| 6,708,385 B1* | 3/2004 | Lemelson ................... 29/563 |
| 6,792,319 B1* | 9/2004 | Bilger ........................ 700/13 |
| 6,813,608 B1 | 11/2004 | Baranowski |
| 6,957,073 B2 | 10/2005 | Bye |
| 7,050,907 B1* | 5/2006 | Janky et al. ............... 701/213 |
| 7,110,833 B2* | 9/2006 | Nagatsuka et al. .......... 700/17 |
| 7,181,228 B2* | 2/2007 | Boesch ................... 455/456.1 |
| 2001/0003443 A1 | 6/2001 | Velazouez et al. |
| 2001/0005178 A1 | 6/2001 | Stewart |
| 2001/0018349 A1 | 8/2001 | Kinnunen et al. |
| 2001/0021182 A1 | 9/2001 | Wakutsu |
| 2001/0024174 A1 | 9/2001 | Turner |
| 2001/0035729 A1* | 11/2001 | Graiger et al. .............. 318/587 |
| 2002/0007407 A1 | 1/2002 | Klein |
| 2002/0030094 A1 | 3/2002 | Curry et al. |
| 2002/0051430 A1 | 5/2002 | Kasami et al. |
| 2002/0058499 A1 | 5/2002 | Ortiz |
| 2002/0101375 A1 | 8/2002 | Stilp et al. |
| 2002/0102995 A1 | 8/2002 | Zelmanovich et al. |
| 2002/0118655 A1 | 8/2002 | Harrington et al. |
| 2002/0123325 A1 | 9/2002 | Cooper |
| 2002/0125886 A1 | 9/2002 | Bates et al. |
| 2002/0131446 A1 | 9/2002 | Metcalf, III |
| 2002/0161633 A1 | 10/2002 | Jacob et al. |
| 2002/0167417 A1 | 11/2002 | Welles, II et al. |
| 2002/0183979 A1 | 12/2002 | Wildman |
| 2003/0011467 A1 | 1/2003 | Suomela |
| 2003/0013456 A1* | 1/2003 | Bates et al. ................. 455/456 |
| 2003/0023882 A1* | 1/2003 | Udom ........................ 713/202 |
| 2003/0061295 A1* | 3/2003 | Oberg et al. ............... 709/208 |
| 2003/0073432 A1* | 4/2003 | Meade ....................... 455/420 |
| 2003/0191767 A1 | 10/2003 | Kabala |
| 2003/0197643 A1 | 10/2003 | Fullerton et al. |
| 2003/0234741 A1 | 12/2003 | Rogers et al. |
| 2004/0192342 A1* | 9/2004 | Ranganathan ............ 455/456.1 |
| 2004/0203895 A1* | 10/2004 | Balasuriya ............... 455/456.1 |
| 2004/0203930 A1 | 10/2004 | Farchmin et al. |
| 2004/0235468 A1 | 11/2004 | Luebke et al. |
| 2004/0260518 A1 | 12/2004 | Polz et al. |
| 2005/0021158 A1 | 1/2005 | De Meyer et al. |
| 2005/0035862 A1 | 2/2005 | Wildman et al. |
| 2005/0078297 A1* | 4/2005 | Doemens et al. ........... 356/5.04 |
| 2005/0096776 A1 | 5/2005 | Beaulieu et al. |
| 2006/0161275 A1* | 7/2006 | Plankl et al. ................. 700/65 |
| 2006/0206817 A1* | 9/2006 | Jung et al. .................. 715/700 |
| 2006/0229746 A1* | 10/2006 | Ollis et al. .................... 700/65 |
| 2006/0242609 A1* | 10/2006 | Potter et al. ............... 715/864 |
| 2007/0030114 A1* | 2/2007 | Rieger ........................ 340/3.1 |

FOREIGN PATENT DOCUMENTS

| | | |
|---|---|---|
| EP | 0 472 874 A1 | 7/1991 |
| EP | 0 626 635 A2 | 11/1994 |
| EP | 0 992 921 A2 | 4/2000 |
| EP | 1 058 171 A2 | 12/2000 |
| EP | 1 233 315 A1 | 2/2001 |
| EP | 1 265 118 A1 | 6/2001 |
| EP | 1 138 451 A2 | 10/2001 |
| EP | 1 209 930 A2 | 5/2002 |
| EP | 0 801 342 B1 | 1/2003 |
| GB | 2 274 521 | 7/1994 |
| GB | 2 365 662 | 2/2002 |
| GB | 2 372 365 | 8/2002 |
| JP | 0 992 921 A2 | 4/2000 |
| WO | WO95/14938 | 6/1995 |
| WO | WO96/23340 | 1/1996 |
| WO | WO98/30045 | 7/1998 |
| WO | WO99/28797 | 6/1999 |
| WO | WO99/39219 | 8/1999 |
| WO | WO 00/17737 | 3/2000 |
| WO | WO 00/50919 | 8/2000 |
| WO | WO 01/16607 A2 | 3/2001 |
| WO | WO 01/22118 A2 | 3/2001 |
| WO | WO01/388797 | 5/2001 |
| WO | WO 01/41546 A2 | 6/2001 |
| WO | WO 01/82032 A2 | 11/2001 |
| WO | WO 02/05107 | 1/2002 |
| WO | WO 02/05107 A1 | 1/2002 |
| WO | WO 02/12992 A2 | 2/2002 |
| WO | WO 02/30053 | 4/2002 |

| WO | WO 02/30053 A1 | 4/2002 |
| WO | WO 02/43428 A1 | 5/2002 |
| WO | WO 02/056274 A1 | 7/2002 |
| WO | WOX 02/054813 A1 | 7/2002 |

OTHER PUBLICATIONS

A Probabilistic Approach to WLAN User Location Estimation; International Journal of Wireless Information Networks, vol. 9, No. 3, p. 155-164; Roos, et al.

A Statistical Modeling Approach To Location Estimation; Master's Thesis, Univ. of Helsinki, Department of Computer Science, May 5, 2001, Teemu Tonteri.

An Indoors Wireless Positioning System Based On Wireless Local Area Network Infrastructure; SatNav 2003, 6th Intl. Symposium on Satellite Navation; Melbourne Australia; Wang et al; 13 pages; Jul. 22-25, 2003.

* cited by examiner

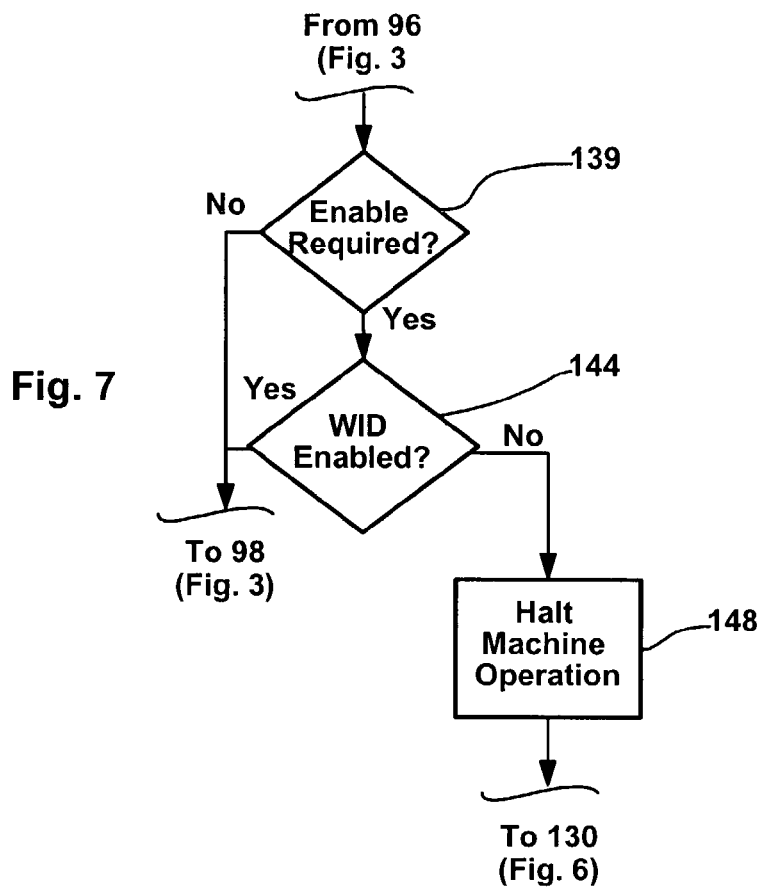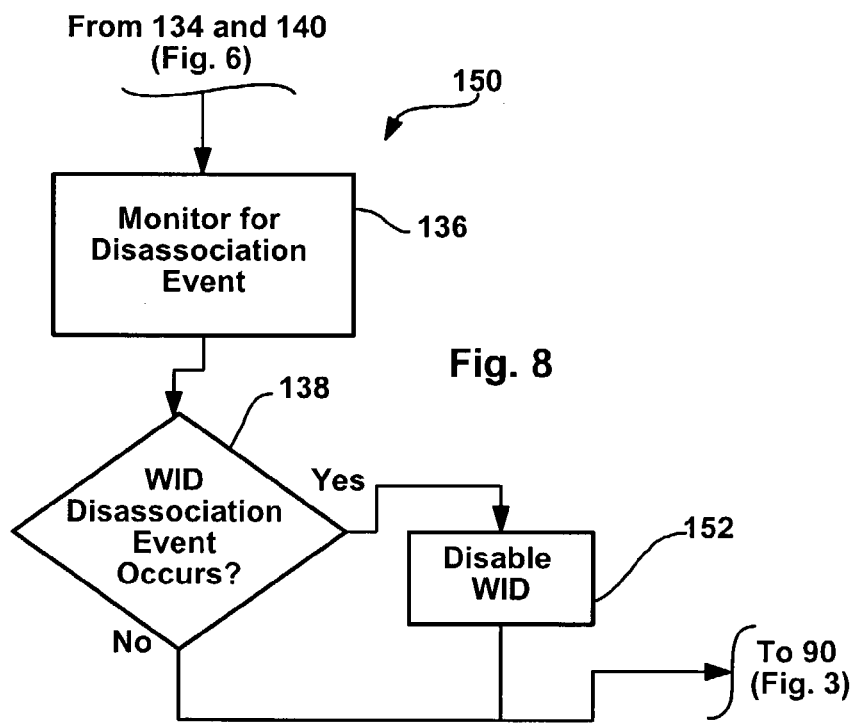

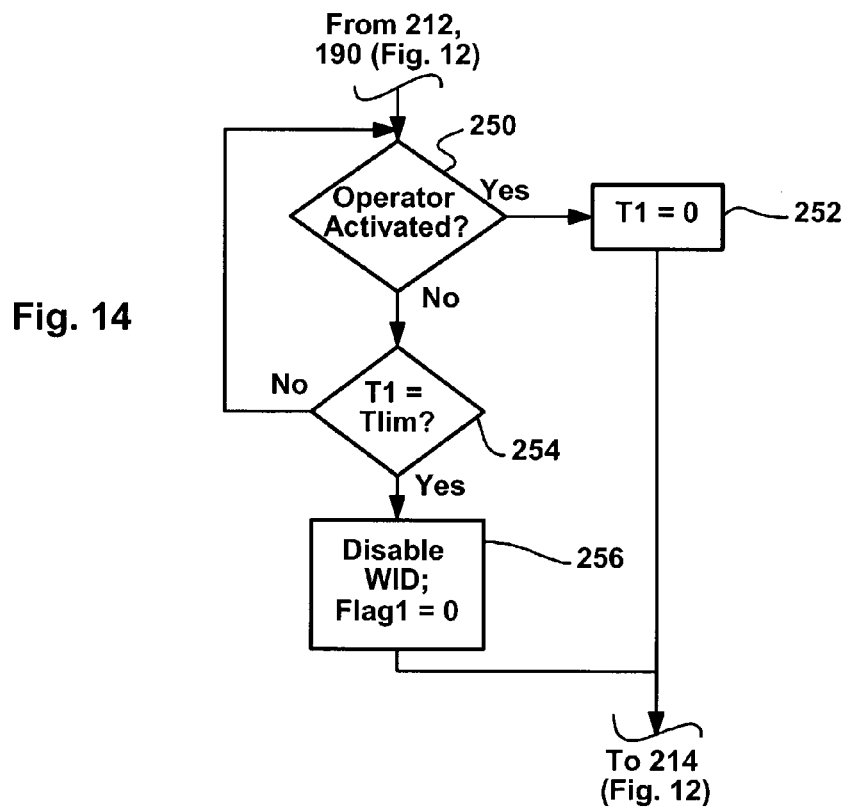

| WID # | Machine Zone | Associated Machines | Authorized Machine Ops | Second WID Limitation | WID Enable Limitation | En. Continuity Limitation | Operator Limitation | WID Interface |
|---|---|---|---|---|---|---|---|---|
| 1 | Z1m | M1 | 1-6; 9 | No | No | No | Yes | Spec 1 |
|   | Z2 | M1 | 1-6 | No | No | No | Yes | Spec 2 |
|   | Z3 | M1 | 1-3 | Yes (Z3) | No | No | Yes | Spec 3 |
|   | Z4 | M1 | 1-2 | Yes (Z1m) | Yes | Yes | Yes | Spec 4 |
|   | ... |   |   |   |   |   |   |   |
|   | Z5 | M7 | ALL | No | Yes | No | No | Spec 5 |
|   |   | M8 | ALL | No | No | No | No |   |
|   |   | M9 | 1-3 | No | Yes | Yes | No |   |
|   |   | M10 | ALL | Yes (Z5) | Yes | Yes | Yes |   |
|   |   | M11 | 7-9; 11; 18 | No | Yes | Yes | Yes |   |
|   | Z6m | M7 | 5-7 | Yes (Z5) | Yes | No | Yes | Spec 6 |
|   | ... |   |   |   |   |   |   |   |
|   | Z11 | M8 | ALL | Yes (Z5) | No | No | No | Spec 7 |
|   |   | M9 | ALL | Yes (Z5) | Yes | Yes | Yes |   |
|   |   | M11 | 8, 9 | Yes (Z5) | Yes | Yes | Yes |   |
|   | ... |   |   |   |   |   |   |   |
|   | ZXX | ... |   |   |   |   |   |   |
| 2 | Z1m | M1 | 1-2; 9 | No | No | No | No | Spec 1 |
|   | Z2 | M1 | 1-4 | Yes (Z1m) | Yes | Yes | Yes |   |
|   | ... |   |   |   |   |   |   |   |
| 3 | Z1m | M1 | None | - | - | - | - |   |
|   | Z2 | M1 | None | - | - | - | - |   |
|   | ... |   |   |   |   |   |   |   |
| XXX | ... |   |   |   |   |   |   |   |

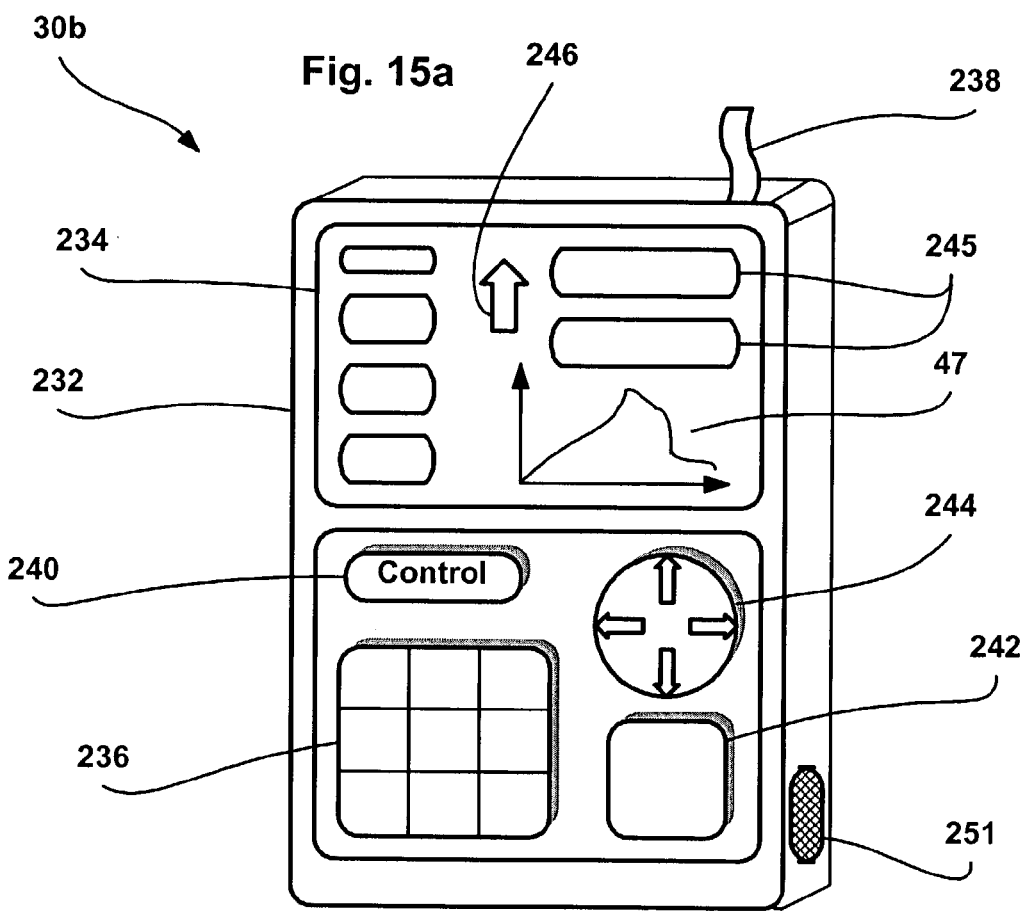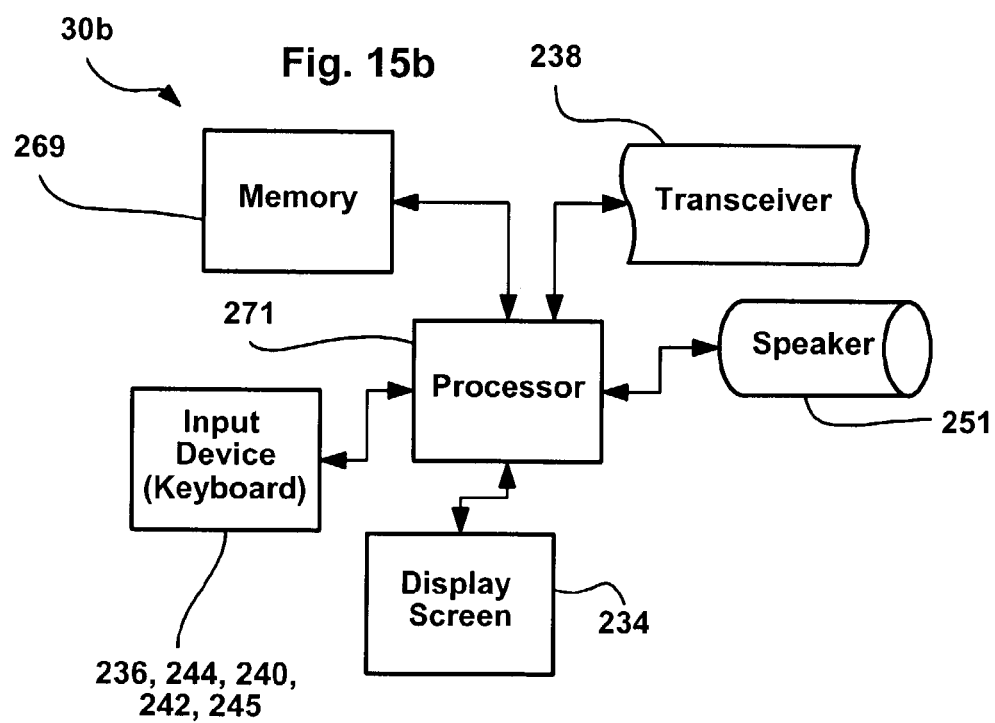

Authorization Specification (AS) —298, 302, 304, 300

| Machine Zone | Associated Machines | Authorized Machine Ops | Operator Limitation |
|---|---|---|---|
| Z1m | M1 | 1-6; 9 | Yes |
| Z2 | M1 | 1-6 | Yes |
| Z3 | M1 | 1-3 | Yes |
| Z4 | M1 | 1-2 | Yes |
| . . . | | | |
| Z5 | M7 | ALL | No |
| | M8 | ALL | No |
| | M9 | 1-3 | No |
| | M10 | ALL | Yes |
| | M11 | 7-9; 11; 18 | Yes |
| Z6m | M7 | 5-7 | Yes |
| . . . | | | |
| Z11 | M8 | ALL | No |
| | M9 | ALL | Yes |
| | M11 | 8, 9 | Yes |
| . . . | | | |
| ZXX | . . . | | |

Fig. 18

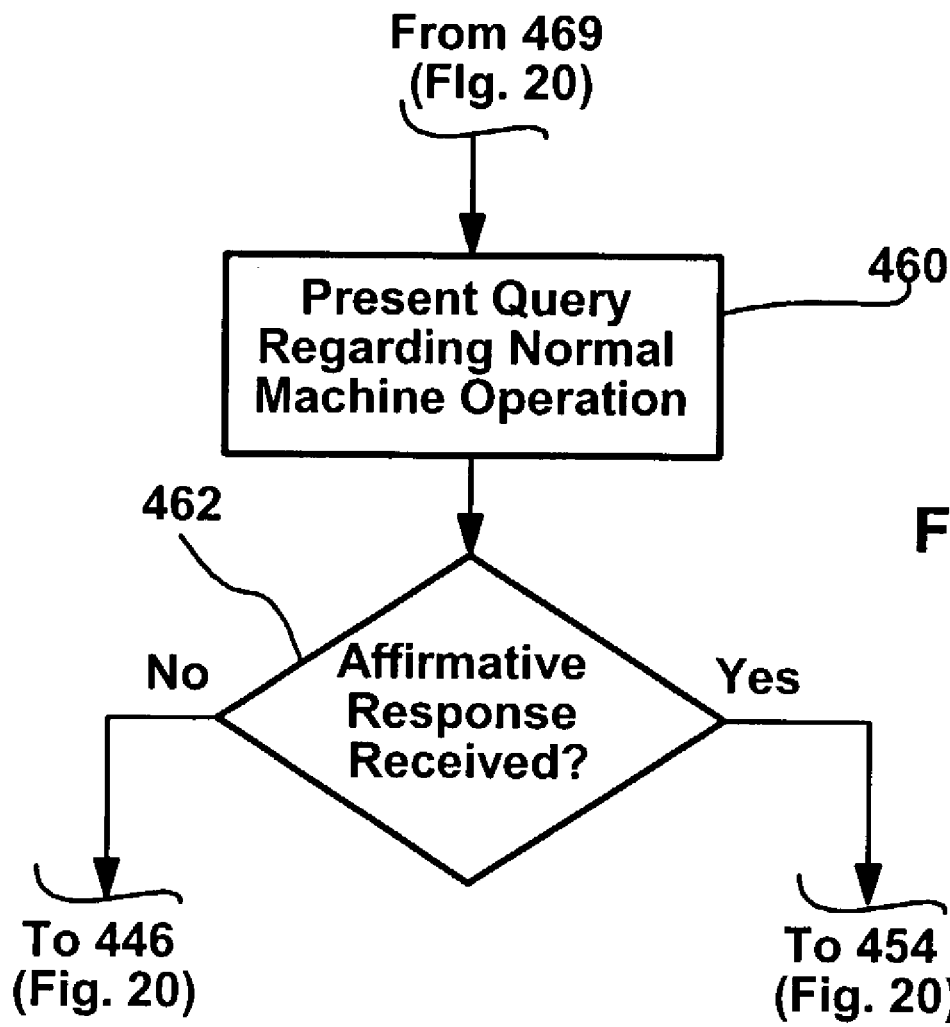

POSITION BASED MACHINE CONTROL IN AN INDUSTRIAL AUTOMATION ENVIRONMENT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The field of the invention is automated controls in an industrial environment and more specifically automatic regulation or limitation of industrial machine operations when a person enters restricted facility locations.

In the manufacturing industry, one primary cost associated with manufacturing processes is labor. For this reason, the manufacturing industry is always searching for ways in which to reduce the amount of labor required to produce products. One way to reduce labor costs has been to configure machinery that can accomplish many of the tasks traditionally performed by factory workers. Recent developments in factory automation have resulted in factories where most tasks are performed by automated computer controlled machinery which has reduced labor costs appreciably. In fact, in many manufacturing facilities a large percentage of labor costs are now associated with machine/controller programming and maintenance tasks. For instance, a maintenance engineer may routinely visit various machines within a facility to observe machine operations and, in many cases, to cause machines to perform various maintenance cycles that are designed to render machine operating problems obvious. While fully and partially automated facilities have many advantages, such facilities still have several shortcomings.

To this end, in most automated facilities there are many areas proximate facility machines that are considered relatively hazardous. For example, a drill press for boring holes into metallic components has a drill head that follows a stroke path during a machining cycle. In this case, at least during a drilling stroke operation, the stoke path is typically considered a hazardous area. As another example, on an automotive assembly line where a transfer line moves partially assembled vehicles from one assembly line station to another between assembly processes, during vehicle transfer it may be hazardous for a tool cart or the like to be located between two vehicles that move along the transfer path.

There are several solutions that can be used to at least substantially minimize the potential problems that may be caused by moving machines in an automated environment. One solution for substantially reducing potential problems is to assign a facility employee to visually determine if safe conditions exist prior to allowing machine operations to occur. This solution has the advantage that the employee can react to unforeseen circumstances and make judgment calls regarding what comprises hazardous conditions. The problem with an employee based solution however, is that this solution is counter to the general goal of reducing labor costs through automation. In addition, in this case, there is a risk that an employee may use poor judgment under certain circumstances. The instances of poor judgment are likely to be great in mundane and relatively boring jobs such as monitoring repetitive machine operations.

Another solution for reducing hazards in an automated facility is to effectively build a physical barrier about relatively hazardous locations and areas proximate machines and restrict access to those areas. In this regard, for instance, a cage may be constructed about a machine to keep facility employees out of a restricted machine zone adjacent the machine. Here, entry into the machine zone may be limited to a single entry way that is kept locked unless affirmatively unlocked by a facility employee. For instance, a maintenance employee may want to enter the restricted zone to observe some machine operations from a particularly advantageous vantage point. Here, the maintenance employee would have to unlock the single entry into the zone to gain access to the zone. It is presumed that, by unlocking the entry, the employee is affirmatively acknowledging that the employee is responsible for activities that occur within the zone and that the employee will be vigilant to make sure activities will be limited to non-hazardous activities. Cages and other mechanical zone restricting barriers will be referred to hereinafter collectively as "physical barriers" unless indicated otherwise.

In order to further enhance safety within machine zones the automated industry has developed emergency stop systems that allow facility employees to signal when potentially hazardous conditions exist after the employee enters a restricted machine zone. Where a hazard is signaled, the emergency stop causes machines to assume parked or "fail safe" conditions. To this end, one emergency stop system includes an operating device that is tethered to a machine controller. The operating device typically includes a lever member that has three general positions including deactivated, partially activated and fully activated. As the labels imply, when in the deactivated position the lever is not depressed, when in the partially activated position the lever is depressed to within a specific mid-level range of activation and when in the fully activated position the lever is depressed to within a range of activation that exceeds the mid-level range.

In this type of system, at least some machine operations are allowed when the operator is in the partially activated mode. However, when the operator is in either the fully activated mode or the deactivated mode, machine operations are restricted to only operations considered to be non-hazardous while a person is within the restricted machine zone. In some cases non-hazardous operation includes completely halting machine operations. Thus, if a potential hazard occurs while a person is inside the machine zone, the person can simply either fully activate or else deactivate the operator thereby causing the machine to assume a parked condition.

In addition to employing hardware systems to reduce the likelihood of a hazard, many facilities adopt safety policies designed to mitigate hazards. For instance, in the case of a machine zone restricted by a physical barrier, many facilities adopt a policy whereby only a single person is allowed into a machine zone at a time. For instance, in one case, the entry way into a zone may be equipped with a light curtain sensing device that senses when a person passes therethrough. After one person passes through the entry way the system may monitor for other persons passing through the entry way and, when another person is detected, the system may cause the machines to assume parked positions or some other non-hazardous operating conditions.

Another solution to reduce the likelihood of hazardous conditions has been to restrict machine operations to a sub-set of normal machine operations or a set of operations that is different than the normal set when an employee is proximate a machine or a group of machines where the restricted set of operations are generally considered non-hazardous. Here, the restricted set is typically chosen so as to be exemplary of machine operations so that a maintenance engineer, for instance, can either observe the machine performing important cycles or can cause the machine to cycle through various cycles and get a good sense of how the machine operates during normal operations. In some cases operations may be restricted when an employee opens a door to enter a physically barriered space proximate operating machines. In other cases where physical barriers are not provided, some type of presence sensors may be provided to sense when an employee is located within a space proximate machines and restrict machine operations accordingly. For instance, presence sensor may take the form of pressure sensing pads on the floor proximate a machine(s), motion sensors, thermal sensor, etc. In still other cases, combinations of physical barriers and presence sensors may be combined to determine when an employee is in a zone in which operations should be restricted. For instance, a cage may include a single entry path where a light curtain senses movement and perhaps direction (e.g., in/out) along the path. Here, where a person is detected moving through the path into the restricted space, until a person is detected moving in the opposite direction machine operations may be limited.

Each of the solutions described above has at least one and typically several shortcomings. One problem with physical barrier systems is that the physical barriers (i.e., a cage or the like) are relatively expensive. A related problem is that physical barriers take up space which is often at a premium in a busy manufacturing facility. Another problem with such systems is that access to zones typically has to be through one or a small number of entry ways which can become burdensome when an employee has to access a large number of machine zones during a few hours. In addition, it may be determined during machine operation that a particularly advantageous location from which to view machine operation is obstructed by a physical barrier. One other problem with at least some of the systems described above is that there is no fool proof way to determine when two or more persons are inside a restricted machine zone.

Yet another problem with systems that rely on physical barriers is that such barriers cannot be quickly and easily altered to accommodate changes in machine layout and/or changing juxtapositions of machines within a facility. This shortcoming is becoming more burdensome as manufacturing facilities move toward product customization and away from mass production such that automated machine configurations need to be quickly changeable to accommodate the needs inherent in the manufacture of customized products.

Even if physical barrier configurations did not have the above shortcomings, such configurations are unsuitable for many applications. For instance, in the case of the vehicle transfer line described briefly above, it may be that assembly line workers have to be able to easily move into and out of locations between vehicles (i.e., within the path of the transfer line) on the transfer line during certain portions of a transfer cycle to perform manufacturing operations. Here, providing a mechanical barrier to entry into locations that are only potentially dangerous during some times would be impractical.

Another instance where mechanical boundaries are unsuitable is where a machine zone that is typically not hazardous is rendered potentially hazardous for some reason. In this case, building a mechanical structure about the machine zone would not be cost effective as, after the potentially hazardous circumstances are eliminated, the mechanical structure would serve no purpose. In fact, in many cases hazardous conditions may be able to be eliminated in the time it would take for a physical barrier to be constructed.

Another problem with systems that enforce restricted machine operations when a person is within a specific machine zone is that the restrictions are often too burdensome and eliminate potentially useful capabilities. For example, restricted zones are often selected to be larger than necessary, the thought being that by making the zones larger than required, the chances of hazardous consequences are greatly reduced.

As another example, where machine operations while a person is within a machine zone are limited to a restricted sub-set of normal operations, the restricted sub-set is often too restrictive for the entire zone. For instance, assume a drill press that performs three separate drilling operations at a transfer line station during normal operation, first and second drilling operations along first and second vertical axis and a third drilling operation along a horizontal axis, the drill press rotating from a vertical orientation to a horizontal orientation between the second and third drilling operations. Also assume a restrictive machine zone that surrounds the press.

In this case, when a person is very close to the press, hazard concerns may necessitate restriction of machine operations to a small sub-set of operations including a single reduced speed vertical press operation with the drill turned off (i.e., with a non-rotating drill bit). Here, despite the fact that other operations may be performed without risking a hazard when a person is further removed from the press yet still in the restricted zone, the most restrictive operating requirements (i.e., the restrictions corresponding to locations adjacent the press) must be enforced throughout the zone. This is because zone restricting systems cannot distinguish among locations within the machine zone.

Yet another problem with systems that restrict machine operations when a person is within a restricted machine zone is that there is no way of personalizing operating restrictions as a function of who the person is that enters the zone. In this regard, often different employees within a facility have different duties related to facility machines and therefore have different requirements regarding machine observation. For instance, an industrial processor programmer may have a need to observe different machine cycles than a maintenance engineer. In these cases, ideally, there should be some way of personalizing machine operating restrictions as a function of who, a programmer, a maintenance engineer, etc., enters a restricted machine zone.

Similarly, even among facility employees having the same general titles (e.g., maintenance engineer), certain employees may have more training than others regarding machine operations and therefore should be authorized to be within a machine zone under circumstances that may be inappropriate for other less trained personnel. Here customization of machine operating restraints would be advantageous.

BRIEF SUMMARY OF THE INVENTION

It has been recognized that the locations of people within a facility can be determined relatively precisely and that the locations can then be used to regulate machine operations in an optimal, inexpensive and relatively safe manner. According to at least one embodiment of the invention, each person within a facility may be equipped with a wireless information device (WID) that can be used to determine when the person is in a restricted machine zone. When the person is in a restricted zone a processor or controller linked to the facility machines can be used to alter machine operations accordingly.

It has also been recognized that many different gradations of regulation based on location may be supported such that machine operations may be restricted in many different ways. Thus, for instance, where a typical machine cycle includes one hundred different sub-processes (e.g., strokes, etc.), when a WID is located within a first location with respect to the machine the machine operations may be limited to fifty of the one hundred typical sub-processes, when the WID is located within a second restricted location machine operations may be limited to twenty of the one hundred typical sub-processes and so on.

Moreover, it has been recognized that WID location can be combined with other attributes or circumstances to support various useful sets of criteria for automatically limiting machine operations. Other criteria include but are not limited to WID type, the specific instance of WID present, predicted future WID location, the locations of other WIDs within a facility, whether or not a WID is enabled, whether or not a machine operator is activated, the location of facility users that are not using WIDs, etc.

At least one embodiment of the invention includes a method for controlling machine operation in an automated industrial facility including at least one machine, the method for restricting machine operations as a function of location of a wireless information device (WID), the method comprising the steps of providing at least one WID, determining if at least one WID is at a restricted facility location and, when at least one WID is at a restricted facility location, regulating operation of at least one machine.

The invention also includes a method for controlling machine operation in an automated industrial environment including at least one machine, the method comprising the steps of (a) identifying at least one machine zone within the environment associated with at least one machine, (b) providing at least one wireless information device (WID), (c) enabling the at least one WID, (d) determining if at least one WID is within the machine zone and (e) where at least one WID is within the machine zone: (i) determining if the WID in the machine zone is enabled, (ii) if the WID is enabled, regulating machine operation according to a first second, else (iii) else, regulating machine operation according to a first regimen.

In addition the invention includes a method for use in an automated industrial facility including at least one machine, the method for controlling machine operations as a function of location of a facility user, the method comprising the steps of specifying at least one restricted location associated with the at least one machine, providing at least one wireless information device (WID), monitoring for facility user presence at the at least one restricted location, monitoring for WID presence at the at least one restricted location, controlling machine operations according to a first regimen when only a user is present at the restricted location and controlling machine operations according to a second regimen when both a user and a WID are present at the restricted location, wherein the first and second regimens are different.

Moreover, the invention includes a method for controlling machine operation in an automated industrial facility including at least one machine and at least one machine zone associated with the machine, the method for restricting machine operation when a wireless information device (WID) associated with a facility user is within the machine zone, the method for use with a WID, an operator device and a processor linked to the machine for controlling machine operations, the method comprising the steps of (a) determining if a facility user is located within the machine zone, (b) if a user is located within the machine zone, determining if the operator is activated, (c) if the operator is activated, determining if a WID is located within the machine zone, (d) if a WID is located within the machine zone: (i) regulating machine operations according to a third regimen and (ii) repeating steps (a) through (d), else regulating machine operations according to a second regimen, else regulating machine operations according to a first regulating regimen.

Furthermore the invention includes a method for controlling machine operation in an automated industrial facility including at least one machine that performs machine operations including machine cycles, the method for restricting machine operation when a wireless information device (WID) associated with a facility user is within restricted facility locations, the method comprising the steps of specifying at least one restricted facility location associated with at least one machine, providing at least one WID, determining if at least one WID is within a restricted facility location, where the at least one WID is within a restricted facility location: (i) identifying the extent of machine cycle completion of the at least one machine, and (ii) regulating operation of at least one machine as a function of the extent of machine cycle completion.

In addition the invention includes a method for controlling machine operation in an automated industrial facility including at least one machine, the method for restricting machine operation as a function of the location of a wireless information device (WID), the method comprising the steps of providing at least one WID, predicting a future location of the WID within the facility and regulating operation of the at least one machine as a function of the predicted WID location.

Yet another embodiment of the invention includes a method for controlling machine operation in an automated industrial facility including at least one machine, the method comprising the steps of (a) specifying at least one machine zone associated with at least one facility machine, (b) providing at least first and second wireless information devices (WIDs), (c) determining if the first and second WIDs are located within the machine zone, (d) when both the first and second WIDs are located within the machine zone, regulating machine operations according to a first regimen and (e) when only the first WID is located in the machine zone, regulating machine operation according to a second regimen that is different than the first regimen.

Yet one more embodiment of the invention includes a method for controlling machine operation in an automated industrial facility including at least one machine and at least one associated machine zone, the method for restricting machine operation as a function of juxtaposition of a facility user with respect to the machine, the method comprising the steps of determining if a facility user is within the at least one machine zone, where a user is within the machine zone, determining user location within the machine zone and regulating operation of the at least one machine as a function of user location within the at least one machine zone.

Still another embodiment of the invention includes a system for controlling machine operations in an automated industrial facility including at least one machine, the system for restricting machine operations as a function of the location of facility users, the system comprising at least one wireless information device (WID), a monitor for obtaining information usable to determine if at least one WID is at a restricted facility location and a controller linked to the monitor and also to the at least one machine, the controller receiving the information from the monitor and determining if the at least one WID is at the restricted location and regulating operations of the machine associated with the restricted location when the WID is at the restricted location.

In addition the invention includes a system for use in an industrial automation facility including at least one machine, the system for controlling machine operation as a function of location of a facility user, the system comprising at least one wireless information device (WID), a first monitor for obtaining information useable to determine if a user is present at the at least one restricted facility location, a second monitor for obtaining information useable to determine if at least one WID is at a restricted facility location and a controller linked to the at least one machine and also linked to the first and second monitors, the controller using information from the first and second monitors to determine if a user and a WID are present at the restricted location, respectively, and controlling machine operations according to a first regimen when only a user is present at the restricted location and controlling machine operations according to a second regimen when both a user and a WID are present at the restricted location, wherein the first regimen is more restrictive than the second regimen.

Moreover the invention also includes a system for controlling machine operations in an automated industrial facility including at least one machine and at least one machine zone associated with the machine, the system for restricting machine operation when a wireless information device (WID) associated with a facility user is within the machine zone, the system comprising at least one WID, an operator device that may be activated by a system user, a first monitor for obtaining information that can be used to determine if a user is present in the at least one machine zone, a second monitor for obtaining information that can be used to determine if a WID is present within the at least one machine zone, a controller linked to the machine for controlling machine operations and linked to the first and second monitors and to the operator, the controller (a) determining if a user is located in the machine zone, (b) if a user is located within the machine zone, determining if the operator is activated, (c) if the operator is activated, determining if a WID is located within the machine zone, (d) if a WID is located within the machine zone: (i) regulating machine operations according to a third regimen, and (ii)repeating steps (a) through (d), else regulating machine operations according to a second regimen, else regulating machine operations according to a first regulating regimen.

The invention also includes a system for controlling machine operation in an automated industrial facility including at least one machine and an associated machine zone, the system comprising at least first and second wireless information devices (WIDs), a monitor for obtaining information useable to determine when each of the first and second WIDs is located within the machine zone, a controller for receiving the monitor information and determining when each of the first and second WIDs is within the machine zone, when both the first and second WIDs are located within the machine zone, regulating machine operations according to a first regimen and when only the first WID is located in the machine zone, regulating machine operations according to a second regimen that is different than the first regimen.

Yet another embodiment of the invention includes a system for controlling machine operation in an automated industrial facility including at least one machine and at least one associated machine zone, the system for restricting machine operation as a function of juxtaposition of a facility user with respect to the machine, the system comprising a monitor for obtaining information useable to determine if a facility user is within the at least one machine zone, a controller linked to the monitor and to the at least one machine, the controller using information from the monitor to determine when a user is located within the machine zone and, when a user is within the machine zone, determining user location within the machine zone and regulating operation of the at least one machine as a function of user location within the at least one machine zone.

The invention also includes a method of controlling machine operation in an automated industrial facility including at least one machine, the method for restricting machine operations as a function of location of a wireless information device (WID), the method comprising the steps of providing at least one WID, establishing communication with at least one WID within a restricted facility location, controlling at least one machine according to a first operating regimen, determining when communication with the at least one WID within the restricted location ceases and controlling at least one machine according to a second regimen when communication with the at least one WID within the restricted location ceases.

Here, the step of controlling according to a second regimen may include one of halting machine operations and causing the machine to assume a fail safe operating mode. Where the machine typically performs a set of normal operations the step of controlling according to a first regimen may include restricting operation of at least one machine associated with the restricted location to a set of operations that is different than the normal set of operations.

In some embodiments the step of determining when communication with the WID at the restricted location ceases includes determining when the WID is located outside the restricted location. Here, when the WID is located outside the restricted location, the step of controlling according to a second regimen may include causing the machine to perform its normal set of operations.

In some embodiments, when the WID is located outside the restricted location, the step of performing a control function includes providing a query to a WID user to determine how the machine should be controlled. The query may provide the option to cause the machine to perform its normal set of operations.

In some embodiments when the WID is located outside the restricted location the step of controlling the machine according to a second regimen includes controlling the machine according to one second regimen, else the step of controlling the machine according to a second regimen includes controlling the machine according to another second regimen. Here, also, the step of controlling the machine according to another second regimen may include causing the machine to assume a fail safe operating mode. Moreover, the step of controlling the machine according to one second regimen may include controlling the machine to perform its normal set of operations.

In several embodiments of the invention, when a WID is located and sensed to be within a restricted zone or location, while the WID is located in the zone or location the WID is essentially continually sensed. In addition, when the WID includes a machine operator function or is used in conjunction with a separate operator to enable at least some operations while the WID is located in a restricted zone or location, if communication with the WID ceases for any reason or the presence of the operator is not assured through the proper actuation of an operator presence switch, operator is not appropriately activated, the machines associated with the location assume a fail safe condition to avoid uncontrolled hazardous conditions.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 2b is a back perspective view of the information device in FIG. 2a;

FIG. 2c is a schematic diagram illustrating components of the device in FIG. 2a;

FIG. 7 is a flow chart illustrating a sub-process for determining whether or not a wireless information device is enabled which may be added to the process of FIG. 3;

FIG. 8 is a flow chart illustrating a sub-process for determining whether or not a device disassociation event has occurred;

FIG. 13 is a schematic diagram illustrating an exemplary authorization specification used by the controller in FIG. 1 to perform various aspects of the present invention;

FIG. 14 is a flow chart illustrating a sub-process that may be added to the process of FIG. 12 for determining whether or not an operator has been activated within a threshold period;

FIG. 15a is a front perspective view a second exemplary wireless information device according to the present invention;

FIG. 15b is a schematic diagram illustrating components of the device in FIG. 15a;

FIG. 16b is a schematic diagram illustrating components of the device of FIG. 16a;

FIG. 18 is a schematic diagram of a second exemplary authorization specification according to the present invention;

FIG. 21 is a sub-process flow chart that may be added to the chart of FIG. 20 to allow a WID operator to determine which operations will occur when a WID is removed from a zone.

DETAILED DESCRIPTION OF THE INVENTION

Figure 1:
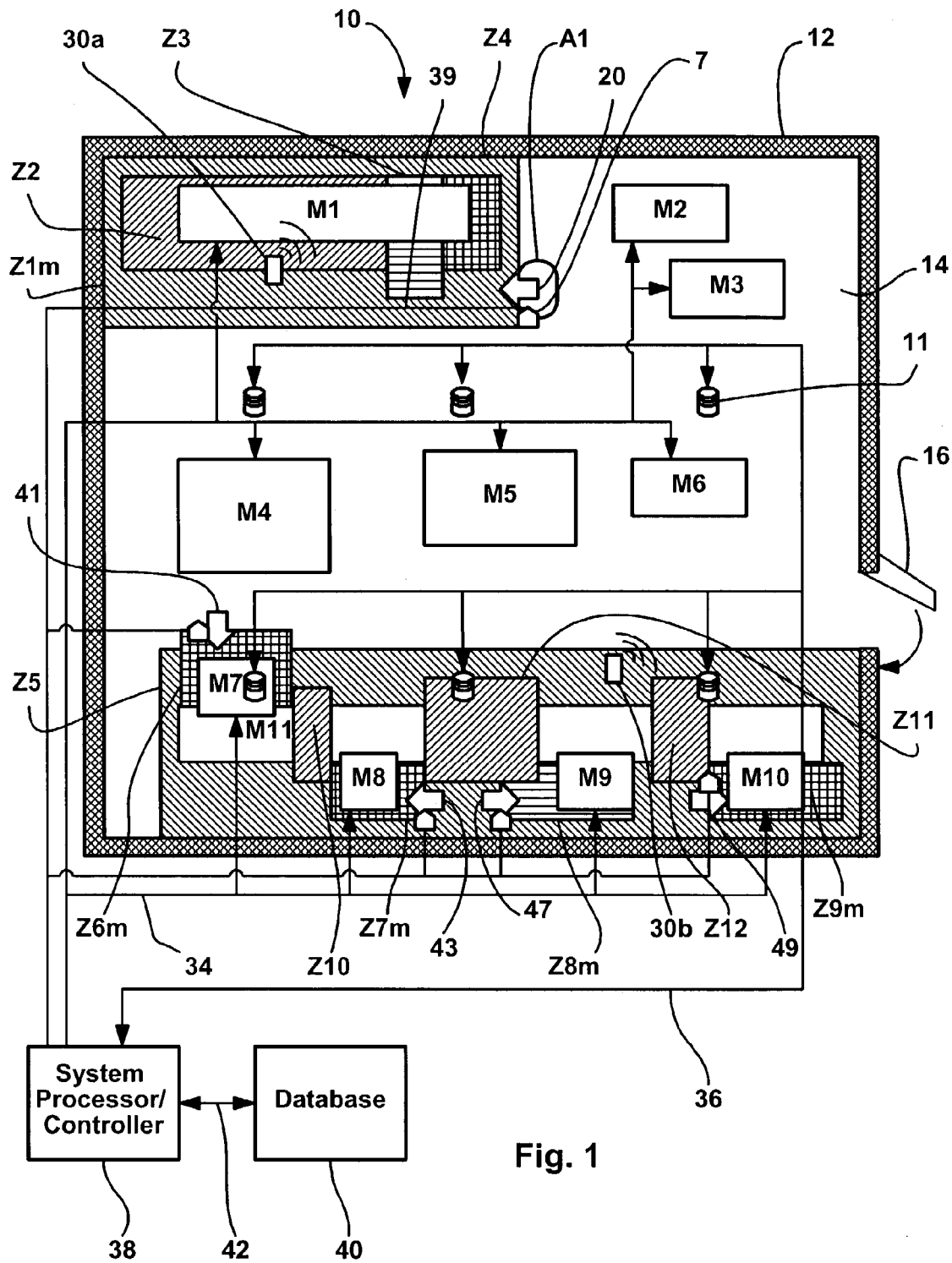
FIG. 1 is a schematic diagram of an exemplary facility and several machine zones according to the present invention.

In the description that follows, initially system components common to most of the inventive embodiments are described. Thereafter various inventive embodiments and aspects are described in detail with reference to the general system components. Although some inventive aspects are described in the context of one or another embodiment, it should be appreciated that most aspects may be used with most of the embodiments and indeed that several aspects may be combined into each embodiment to provide additional synergistic functionality.

Referring now to the drawings wherein like reference numbers correspond to similar elements throughout the several views and, more specifically, referring to FIG. 1, the present invention will be described in the context of an exemplary, albeit simplified, manufacturing facility 10 that includes a rectilinear facility floor space or area 14 confined by four facility walls collectively identified by numeral 12. In the exemplary facility 10, entire area 14 comprises a single room (i.e., there are no wall partitions within facility 10 and all of the facility resides on a single level). A doorway 16 is provided to allow access to area 14.

As illustrated in FIG. 1, exemplary facility 10 includes eleven separate machines identified by labels M1 through M11. The exemplary machines M1 through M11 may include any type of manufacturing machine such as a mill, a drill, a transfer line, a laser cutting device, a vision system, any of several different types of robots, clamps, etc. The machines M1 through M11 are shown as being different sizes to visually illustrate that the machines may have different physical footprints. For example, machine M4 is illustrated as having a much larger physical footprint than machine M8. Similarly, machine M11 is a relatively long machine when compared to the other illustrated machines. Hereinafter, it will be assumed that machine M11 is a transfer line. In general, machines M1-M11 are spaced out within area 14 although, in some cases, machines may be positioned directly next to each other such as, for instance, transfer line M11 and other machines M7, M8, M9 and M10 that are spaced along transfer line M11.

It is contemplated that each of machines M1-M11 includes at least one and, in many cases, a plurality of sensing devices (not illustrated) that sense machine operating characteristics and provide signals that can be used to facilitate machine monitoring via an interface (i.e., a WID). For instance, in the case of a drilling machine, sensors may include limit switches that are tripped when a drill slide reaches various positions along a travel path, on/off switches, speed sensing switches, motor operating characteristic sensors, etc.

In addition to including sensing devices, it is contemplated that most, if not all, of machines M1-M11 will includes some type of control interface to facilitate control and control adjustment. For example, again, in the case of a drilling machine, drill slide stroke length may be altered, drill speed may be altered, the angle at which a drill bit enters a work piece may be altered, etc.

In addition to the components described above, facility 10 also includes a plurality of first monitors 7 (only one labeled), a plurality of second monitors also referred to as communication access points 11 (only one numbered), a system processor/controller 38, a database 40, at least one wireless information device (WID) 30a, 30b and a plurality of two-way data buses 34, 36, 39 and 42. Unless indicated otherwise WIDs will be generally referred to by reference 30a hereafter.

Controller 38 may be positioned within facility 10 or may be located at some remote location such as, for instance, in a separate building, in a separate room within the facility that includes area 14 or at a completely different location such as a remote campus associated with facility 10. In addition, in many industrial environments, controller 38 will be physically associated with specific machine lines so that the controller 38 may be positioned, for instance, at the front end of a line of machines to facilitate easy access to machine operating characteristics adjacent the machines and/or to allow operating characteristics to be altered in a proximate manner. In FIG. 1, controller 38 is linked to each of machines M1-M11 via two-way data bus 34 that allows controller 38 to monitor machine operating characteristics as well as control machine operation.

Controller 38 is typically a processor based workstation capable of running various types of computer programs. For instance, some programs are machine control programs that enable controller 38 to either separately control each machine M1-M11 or, safely and precisely sequence machine operation thereby allowing relatively complex manufacturing processes to be performed in an efficient manner. In addition, other controller programs may allow controller 38 to derive various machine operating characteristics from monitored or sensed characteristics (e.g., motor voltage and current data is useful to derive stator and rotor resistance estimates, system inductances, identify harmonics, determine system torques, etc.) and to run complex algorithms to identify operating trends, alarm conditions, potentially hazardous conditions, maintenance requirements, raw material requirements and so on. Moreover, controller 38 also runs programs that facilitate data management and warehousing so that subsequent algorithms may be applied to warehoused data to identify historical operating patterns for various purposes. Furthermore, when potentially hazardous conditions occur, controller 38 may be programmed to cause the machines M1-M11 to assume non-hazardous operating conditions (e.g., a reduced set of operations or, in some cases, a state in which all mechanical components are parked).

Furthermore, controller 38 may also run programs designed to facilitate interfacing with facility operators (e.g., maintenance personnel, process engineers, etc.) thereby providing control capabilities and system monitoring capabilities. To this end, controller 38 may include its own input and output interfacing devices such as a display screen, a keyboard, a pointing and selecting device such as a mouse or trackball or any other types of interfacing devices known in the art. Although not illustrated, other interfacing devices may be provided within facility 10 to enable monitoring and control.

In an automated environment all the programs described above and the machines controlled thereby are designed so as to have fail safe operating characteristics. For instance, where a drill press performs a cycle requiring the press to move vertically downward from a retracted position to an extended position and then from the extended position back to the retracted position, the press and program segment for controlling the press are designed such that, if the press actuator fails to operate or if an extend sensor fails to sense an extended press within an expected time period, the press assumes the safe retracted position.

Controller 38 is linked via two-way data bus 42 to data base 40. Controller programs are stored in database 40. In addition, data generated by controller 38 is stored in database 40 and can be accessed to allow examination of historical machine operating characteristics, real time operating characteristics and any other data generated by algorithms performed by controller 38.

Referring still to FIG. 1, each information access point 11 includes a two-way wireless transceiver that, as well known in the computer arts, is capable of transmitting and receiving electromagnetic (e.g., radio or infrared) signals within an area proximate the transceiver. Wireless transceivers like access points 11 are well known in the industry and therefore, in the interest of simplifying this explanation, will not be described here in detail. For the purposes of the present invention, it should suffice to say that each transceiver 11 transmits information signals which decrease in strength as distances from the transceiver increase. In the illustrated example, six separate access points 11 are provided within area 14 and are generally equi-spaced within area 14. Typically, access points 11 will be mounted on the ceiling within an area 14 to allow relatively unobstructed communication between an access point 11 and other devices that communicate therewith. While access points 11 are illustrated as being substantially equi-spaced within area 14, it should be appreciated that other access point arrangements are contemplated and that, in many cases, other access point arrangements may be most suitable given specific machine layouts, the physical characteristics of each machine and machine zone layouts (described below).

Controller 38 is linked to each access point 11 via two-way data bus 36 that allows controller 38 to receive information from the access points 11 and also allows controller 38 to provide information to each of the access points 11 for transmission within area 14. Information received from each access point 11 is typically tagged by the access point so that controller 38 can determine which access point 11 provided the received information. This tagging may either be performed by the access point 11 earmarking data packets with an access point identifier (e.g., an access point number) or, in the alternative, may be facilitated by simply providing separate hardwires from each of the access points 11 to the controller 38. In a similar fashion, controller 38 and access points 11 are configured such that controller 38 can address information to each separate and specific access point 11.

Referring still to FIG. 1, in at least one embodiment of the invention, each WID (e.g., 30a) includes a portable wireless device having at least a transmitter so that the WID 30a can wirelessly transmit information via electromagnetic communication or some other suitable wireless communication to access points. Thus, generally, WID 30a is equipped to transmit to any access point 11 in area 14.

It should be appreciated that, while the illustrated area 14 is relatively small, many industrial facilities may include much larger spaces such as, for instance, spaces including tens of thousands of square feet. In these cases, it is contemplated that the transmitting distance of a typical WID 30a will be insufficient to transmit information to all access points within a facility. In other words, while WID 30a may be able to transmit to each access point 11 within a facility, transmission will be limited by signal strength capabilities and reliable transmissions will require a WID proximate access points.

Referring still to FIG. 1, according to at least one embodiment of the present invention, sub-spaces within area 14 are earmarked or identified as machine zones or locations associated with each of the separate machines M1-M11. The different zones in FIG. 1 are identified by hatched rectilinear blocks where the different hatch types (e.g., diagonal, vertical, horizontal, double, etc.) are used to indicate spaces associated with different levels of machine regulation as described in greater detail below. For instance, a space identified by label Z4 includes a relatively small region adjacent one end of machine M1 that is specifically associated with machine M1, space Z4 referred to hereinafter as a machine zone or restricted location associated with machine M1. Other labeled machine zones or restricted locations in FIG. 1 include machine zones Z1m, Z2 and Z3, and Z4 that are also associated with machine M1 and machine zones Z5 through Z12 that are associated with other facility machines as described in greater detail below.

Although not illustrated, it should be appreciated that machine zones would also likely be specified for each of machines M2 though M6 and that, in some cases, no machine zones may be specified for one or more of the facility machines. Some zones may include very small spaces so that, in fact, to be in a zone, a facility employee would have to effectively be located at a single location or point within the facility 10. Moreover, some zones that are associated with specific machines may not be immediately adjacent the associated machines but instead may be separated from the associated machines. For instance, in FIG. 1, despite a space between zone Z10 and machine M8, Zone Z10 may be associated with machine M8 such that machine M8 operation is a function of whether or not a person is located within zone Z10.

In FIG. 1, zone Z1m includes a space that encompasses each of smaller zones Z2, Z3 and Z4. Similarly, zone Z5 encompasses a space including zones Z7m, Z8m, Z9m and Z10 through L12 as well as part of zone L6m. Zones that do not include other zones and that are not included in other zones are contemplated.

Each machine zone corresponds to a small region within area 14 in which it has been deemed prudent to, when a facility employee is present within the zone, regulate machine operations in some fashion to minimize the potential for hazards within facility 10. In this regard, the term "regulate" is used to refer in a broad sense to any manner of restricting machine operations that is different than the way operations are restricted during a typical manufacturing cycle. For example, in one case, regulation may include completely halting machine operations. As another example, regulation may simply include modifying (e.g., slowing) speed with which a machine performs normal operations. Regulation may enable a machine to continue normal operations as long as some other secondary criteria is satisfied. Secondary criteria may, for instance, include continued activation of a deadman switch, certain qualifications of the employee in a zone, the locations of other facility employees (e.g., is there a second employee in the zone), enablement of the WID, etc.

Regulation may also limit machine operations to a set including at least some operations other than the normal operations performed by the machine during a manufacturing cycle. For instance, regulation may facilitate full stroke sliding action of a drill press whereas full stoke sliding is not typically performed during a manufacturing cycle. Yet another type of regulation may allow all normal machine operations but require manual control thereof by a WID user. Hereinafter, unless indicated otherwise, the machine operations that may be performed when a person is within a machine zone will be referred to as the "regulated operations sub-set" (ROS) for the zone.

In the case of some zones no physical barriers will be associated with the zones. Where no physical barriers are associated with a zone, the zone is simply earmarked on an electronic map (e.g., a map similar to the FIG. 1 schematic) stored somewhere in database memory 40 for access by controller 38. In some cases where there is no physical barrier a zone may nevertheless be marked off with some type of zone indicating indicia such as, for instance, paint on the floor that indicates the four corners of a rectilinear machine zone, paint that identifies all zone boundaries, etc. Where indicia is provided, the indicia operates as a visual aid to help facility employees determine when they are located within machine zones and to help employees stay outside machine zones if the employees so choose. Where a zone is not physically restricted, it is contemplated that facility employees will be able to enter the zone along any trajectory that is not blocked by some other mechanical device such as, for instance, one of the facility machines.

Where no physical barriers are provided, in many systems, there will some type of presence sensor for sensing when a person that is not using a WID as described below is located within a machine zone. For instance, a motion sensor, floor mat pressure sensor, thermal sensor, etc., may be provided to monitor presence within an associated zone.

In other cases machine zones will be physically restricted by, for example, a cage constructed around the zone. Cages and other physical barriers are provided to clearly mark restricted locations and to ensure that facility employees do not stray unknowingly into those restricted locations.

In FIG. 1, zone labels including an "m" qualifier are assumed to be mechanically restricted. Thus, for instance, each of zones Z1m, Z6m, Z7m, Z8m and Z9m is mechanically restricted while zones Z2, Z3, Z4, Z5, Z10, Z11 and Z12 are not mechanically restricted. It is also assumed that there is only one entry path into each mechanically restricted zone. For instance, a path icon 20 in FIG. 1, indicates an entry path into zone Z1. Similar path icons 41, 43, 47 and 49 indicate entries into each of zones Z6m, Z7m, Z8m and Z9m, respectively. Because Zone Z1m includes each of zones Z2 through Z4 and there is only one entry path 20 into zone Z1m, a facility employee must pass along path 20 in order to gain access to any of zones Z1m, Z2, Z3 or Z4.

In some cases a locking mechanical door will be provided to close off entries to zones having physical barriers and will require some type of unlocking process to gain access. In other cases the entries may be equipped with a light curtain or some other proximity or movement sensor device for sensing when a person or object moves therethrough. In order to simplify this explanation it will be assumed that each of access entry paths 20, 41, 43, 47 and 49 includes a light curtain and is not blocked by a mechanical door unless indicated otherwise. One light curtain sensor system or monitor is identified by numeral 7 in FIG. 1. User monitors 7 are linked to controller 38 via two way bus 39.

Referring still to FIG. 1, as indicated above, differently hatched markings are used to distinguish one zone form another with respect to restrictiveness of the regulated operations sub-sets. Generally although not necessarily, zones that are physically closer to machines earmark spaces in which ROSs are restricted to a greater degree than zones that are further from the machines. For instance, assume that machine M1 performs 10 separate operations during a manufacturing cycle including, for instance, several sliding motions, rotations, activations of drills or mills, etc. Here, when a facility employee is located in zone Z1m but outside other zones Z2, Z3 and Z4, machine M1 may be regulated to perform only ROS operations 1-6 and 9.

Similarly, when a facility employee is located in zone Z2, machine M1 may be regulated to perform ROS operations that can occur when the employee is within zone Z1m and outside the other more restrictive zones. Herein it will be assumed that the sub-set corresponding to zone Z2 includes operations 1-6 and does not include operation 9. Operations are further regulated in zones Z3 and Z4. For instance, for the purposes of the present invention it will be assumed that machine M1 operations are restricted to operations 1-3 when an employee is located within zone Z3 and to operations 1 and 2 when an employee is located within zone Z4.

Generally, in FIG. 1, minimal regulation is identified by left to right downward cross hatches (e.g., see zones Z1m and Z5), relatively greater regulation is identified by right to left downward cross hatches (see zone Z2), even greater regulation is identified by horizontal hatches (see zone Z3) and the most restrictive regulation is identified by dual vertical and horizontal cross hatches (see zone Z4). Additional levels of restrictiveness are contemplated.

Referring still to FIG. 1, in addition to including user monitors 7 at each access path (e.g., 20) into a physically restricted zone (e.g., Z1m), user monitors 7 may also be provided for each non-physically barriered zone or a subset of the non-barriered zones. For instance, although not illustrated, zone Z5 may include floor mounted pressure pads for sensing user presence within zone Z5. other user monitor types may include motion sensors, light sensors, thermal sensors, etc.

According to at least one aspect of the present invention and referring still to FIG. 1, controller 38 controls machine operations as a function of facility employee location to ensure that machines are operated in ways that are deemed non-hazardous. To this end, when a WID 30a present within facility 10 is turned on, controller 38, access points 11 and the WID 30a cooperate to determine WID 30a location within facility 10. Once WID 30a location has been determined, controller 38 accesses the facility map in database 40 and determines if WID 30a is within one of the machine zones Z1m through Z12 corresponding to one or more of machines M1 through M11. In at least some embodiments of the invention, if WID 30a is within a machine specific zone, controller 38 halts machine operations.

In more complex embodiments of the invention controller 38 may regulate machine operations as a function of both WID presence within a machine zone and whether or not one or more secondary criteria have been met. For instance, the secondary criteria may include WID or the WID user's identity, presence of other WIDs or facility employees within the machine zone in which the WID is located, whether or not a WID has been enabled and remains enabled, whether or not a machine operator (e.g., deadman switch) is activated, etc.

Where secondary criteria are used in conjunction with a determination that a WID is present in a machine zone, an authorization specification (AS) is accessed that defines the secondary information and associated machine regulations. In at least some embodiments of the present invention the AS is stored in database 40 for access by system controller 38 (see again FIG. 1).

Referring now to FIG. 13, an exemplary AS 198 is illustrated that includes an authorization specification table that has eight separate columns including a WID# column 200, a machine zone column 202, an associated machines column 204, an authorized machine operations column 206, a second WID limitation column 208, a WID enable limitation column 210, an enablement continuity limitation column 214 and an operator activation limitation column 215. It is contemplated that at least some of the embodiments of the present invention will not require all of the information in specification 198. Thus, different aspects of the invention will be described with reference to different sub-sets of the columns of AS 198 in the description that follows. Nevertheless, it should be appreciated that at least some of the embodiments of the present invention may include and use all of the information in exemplary specification 198 and, in deed, may include additional secondary limitations as qualifiers for determining how machines should be regulated.

As it's label implies, WID# column 200 includes a list of WIDs that may possibly be used within facility 10. In this regard, the WIDs listed in column 200 include WID#1, WID#2 through WID#XXX. As indicated above, one simple WID type may include a transmitter for transmitting a signal to access points that can be used to determine WID location. Nevertheless, many different types of WIDs are contemplated and the WIDs in column 200 may include either a single type of WID or may include many different WID types where the different types have different capabilities. Several WID types are described in greater detail below.

Machine zone column 202, as its label implies, lists all of the facility machine zones for each of the WIDs listed in column 200. For example, with respect to WID#1 in column 200, zone column 202 lists machine zones Z1m, Z2, Z3, Z4, all the way through machine zone ZXX. The same machine zone list is provided for WID#2 and for each other WID listed in column 200.

For each WID/zone combination represented in columns 200 and 202, associated machines column 204 includes a list of all of the machines that may have their operations regulated when the WID in column 200 is in the zone in column 202. For instance, referring also to FIG. 1, when WID#1 in column 200 is within machine zone Z1m, the only machine within facility 10 that may have its operations regulated as a function of WID#1 being in zone Z1m is machine M1 and therefore, only machine M1 is listed in column 204 as being associated with the WID#1 and machine zone Z1m combination in columns 200 and 202. Similarly, machine M1 is the only machine listed in column 204 for the combinations that combine WID#1 with each of machine zones Z2, Z3 and Z4.

In the present example, referring again to FIG. 1, it is assumed that when WID#1 is within machine zone Z5, each of machines M7, M8, M9, M10 and M11 may have their operations restricted. Therefore, in FIG. 13, for the WID/zone combination including WID#1 and machine zone Z5, each of machines M7, M8, M9, M10 and M11 is listed in associated machines column 204. As one other example, referring still to FIG. 1 and also to FIG. 13, when WID#1 is in machine zone Z11, as indicated in associated machines column 204, each of machines M8, M9 and M11 may have their machine operations regulated in some fashion.

Referring still to FIG. 13, for each WID, machine zone and associated machine combination in columns 200, 202 and 204, authorized machine operations column 206 lists a sub-set of the normal machine operations that may (e.g., in some cases the operations will only be performed if additional secondary criteria have been satisfied) be performed by the machine in column 204 when the associated WID in column 200 is in the associated machine zone in column 202. For instance, consistent with the example described above, when WID#1 is in machine zone Z1$m$, associated machine M1 (see column 204) may only perform machine operations 1-6 and 9 (see column 206) which is a sub-set of the ten machine operations that machine M1 typically performs. Similarly, when WID#1 is in machine zone Z4, machine M1 may only perform machine operations 1 and 2.

In a relatively simple form of the present invention where the only secondary criteria used to determine if machine operations should be enabled relates to WID identity, AS 198 may only include columns 200, 202, 204 and 206. Hereafter, a relatively simple embodiment of the present invention is first described in the context of a simplified AS including columns 200, 202, 204 and 206. Columns 208, 210, 214 and 215 are described in greater detail below with respect to additional embodiments and/or aspects of the present invention.

Referring now to FIGS. 2$a$, 2$b$ and 2$c$, a first relatively simple exemplary WID 30$a$ is illustrated. WID 30$a$ includes, generally, a plurality of components that are mounted within a hardened plastic or metallic housing identified by numeral 32 which has a front surface 39 and a rear or back surface 65. In this embodiment, WID 30$a$ is in the form of an identification badge, and to that end, on front surface 39, includes a picture 61 and a space 63 for printed information (e.g., height, hair color, identification number, eye color, etc.) that can be used to list identifying physical traits of the facility employee for whom the badge was issued. Some type of attachment mechanism such as a pin 73, clip or the like is provided on the back surface 65 of WID 30$a$ for securely attaching WID 30$a$ to a WID user's shirt, jacket, etc.

Referring specifically to FIG. 2$c$, in this simplified form, WID 30$a$ includes a processor 71, a memory 68 and a transmitter 67 (reader 79 and sensor 83 are described hereafter in the context of another inventive embodiment). Processor 71 is linked to each of memory 68 and transmitter 67. Here, it is contemplated that some type of WID or WID user identifier is stored in memory 68 that can be transmitted by processor 71 via transmitter 67 to access points 11 (see again FIG. 1). The transmitted signal is used to determine WID 30$a$ location and, in at least some embodiments, which WID or which WID user is being located. Thereafter, machine regulation is premised on WID location and also, perhaps, upon which WID or WID user is present at a specific facility location.

Hereinafter, unless indicated otherwise, the inventive processes and methods will be described with respect to WID#1 in AS 198 in FIG. 13 which may be referred to as first WID#1. Nevertheless it should be understood that the processes and methods described herein are performed simultaneously to monitor locations of all active WIDs within facility 10 and to control machine operations as a function of the location of all active WIDs.

Figure 2A:
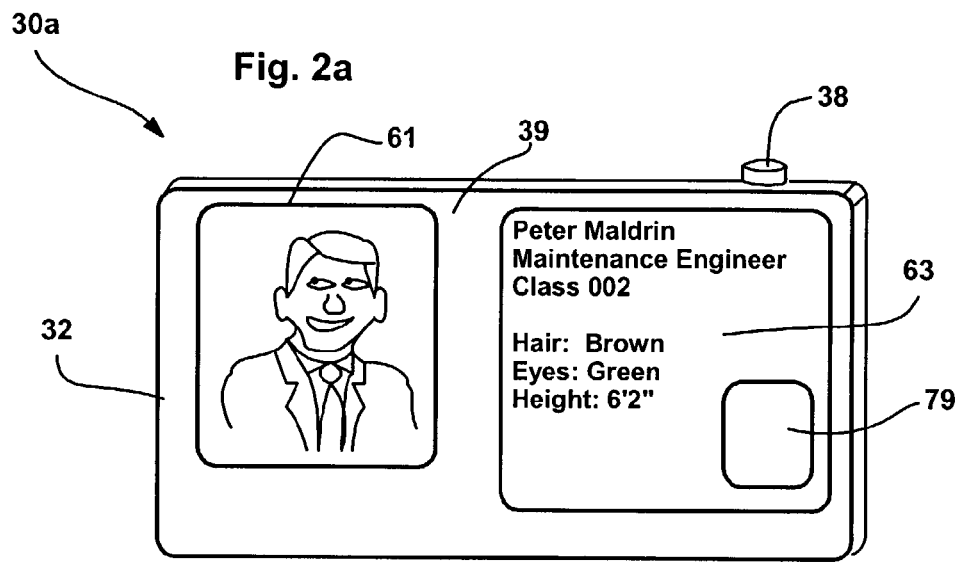
FIG. 2a is a front perspective view of a first embodiment of a wireless information device according to the present invention.
Figure 2B:
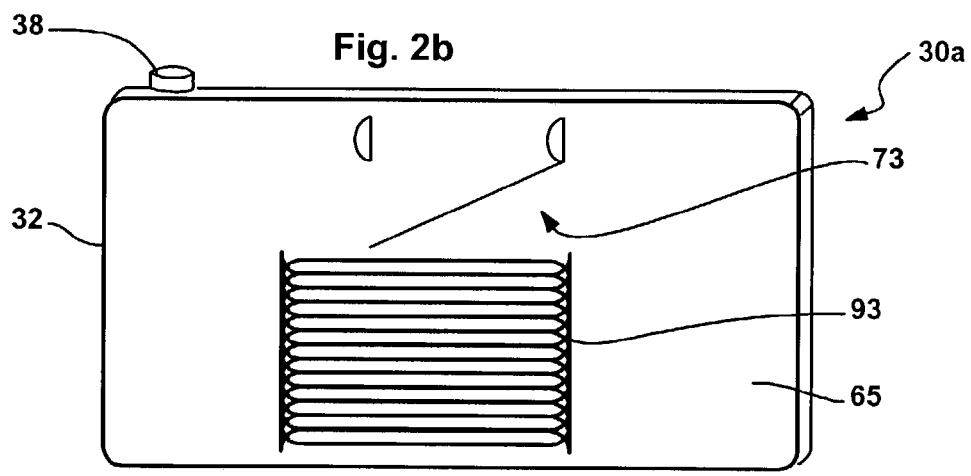
Figure 2C:
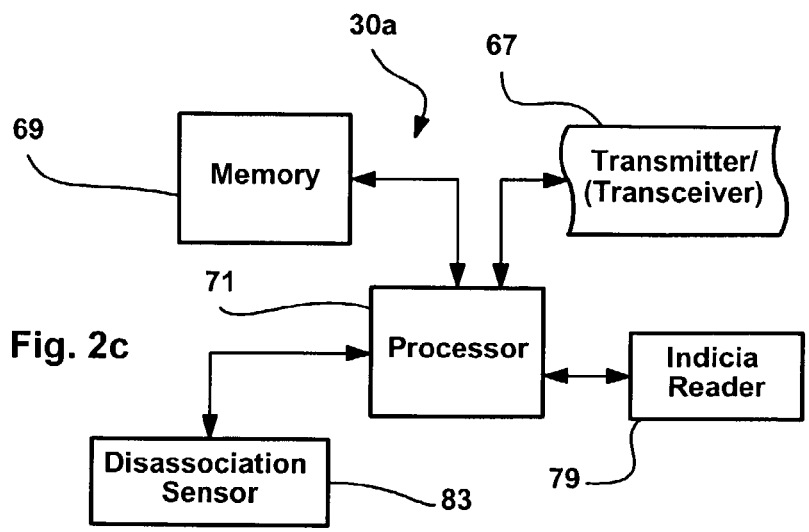
Figure 3:
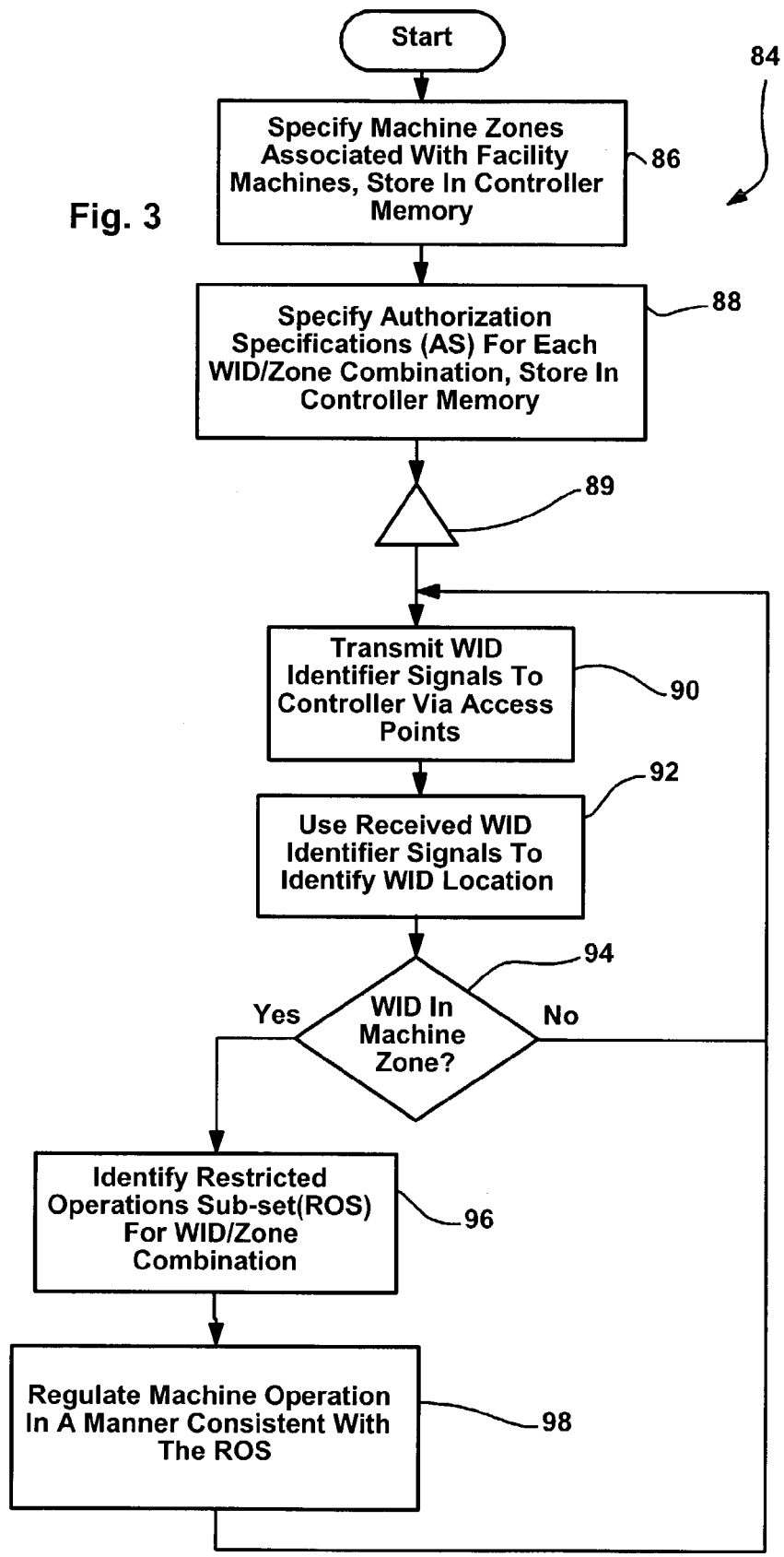
FIG. 3 is a flow chart illustrating one method according to the present invention.

Referring now to FIG. 3, one exemplary process 84 according to the present invention is illustrated which may be performed using a first WID of the type illustrated in FIGS. 2$a$-2$c$. In FIG. 3 and other process type figures described hereafter, generally the process is dividable into two different sub-processes including a commissioning process and a system operation process. During the commissioning process facility machine zones, authorization specifications and system controller algorithms are specified and stored in database 40 and/or in part in WID memory 69 (see again FIG. 2$c$). The commissioning process and, more specifically, the zone defining process, may take any of several different forms and the present invention should not be limited to any one type of commissioning process.

After commissioning is completed, the system operation process includes steps that are performed by system components to regulate machine operations as a function of WID location and, in some cases, other secondary criteria. In the process figures a triangle symbol (see, for example, 89 in FIG. 3) is used to identify a transition from commissioning to operation.

Referring to FIG. 3 and also to FIGS. 1 and 13, at block 86 restricted locations or machine zones (e.g., Z1$m$, Z2, etc.) are specified and associated with specific facility machines and a machine zone map (e.g., the schematic of FIG. 1 or something a kin thereto) is stored in system database 40. Next, at block 88, an authorization specification similar to AS 198 in FIG. 13 is specified. In the present embodiment the AS includes a table having columns 200, 202, 204 and 206. The AS 198 is stored in database 40 for use by controller 38.

After the commissioning process is complete, when first WID#1 is turned on and is brought into facility area 14, WID#1 transmits a WID identifier (e.g. a WID number) at a specific and known signal strength to access points 11 proximate WID#1 at block 90. When an access point 11 receives a transmitted signal, the access point 11 identifies the signal strength and the WID identifier, packages those two bits of information along with an access point identifier and transmits this information packet via data bus 36 to controller 38.

At block 92, controller 38 uses the signal strengths and the access point identifiers to determine the precise location of WID#1 within area 14. Any of several different methods to determine WID location using signal strength may be employed. For instance, a signal triangulation method whereby the intersection of three access point signal strength circles is used to determine location may be employed. Other statistical methods of locating are also contemplated.

At block 94, after WID#1 location has been precisely identified, controller 38 access the facility map in data base 40 and determines in which, if any, machine zone, WID#1 is located. If WID#1 is not located in a machine zone, control passes back up to block 90 where the location determining steps 90 and 92 are repeated. This loop including blocks 90, 92 and 94 is repeated until controller 38 determines that WID#1 is located within a machine zone. Where WID#1 is located within a machine zone, control passes from block 94 to block 96.

At block 96, controller 38 accesses AS 198 (see again FIG. 13) stored in database 40 and identifies the portion of AS 198 corresponding to WID#1 located in the specific machine zone. For instance, referring again to FIGS. 1 and 13, when WID#1 in column 200 is located in machine zone Z4, controller 38 uses AS 198 to identify the ROS including operations 1 and 2 for machine M1 at block 96.

After the ROS has been identified, control passes to block 98 where controller 38 regulates machine operation in a manner consistent with the identified ROS. In the above example, where WID#1 is in zone Z4, controller 38 controls machine M1 so that machine M1 can only perform a regimen of operations including machine operations 1 and 2.

Here, in at least some embodiments of the invention, it is contemplated that there may be some type of user input interface or console proximate machine M1 which may allow a user within zone Z4 to control either of machine operations 1 or 2 for machine M1. In the alternative, it may be that machine M1 automatically performs machine operations 1 and 2 when WID#1 is brought into zone Z4.

In a similar fashion, according to this first embodiment of the invention, referring still to FIGS. 1 and 13, when WID#1 is located in zone Z5, controller 38 restricts machine M11 so that machine M11 is only capable of performing the ROS including operations 7-9, 11 and 18 (presumably a sub-set of the normal operations performed by machine M11), machine M9 is restricted to perform only machine operations 1-3 and so on. Thus, presence of a WID in a zone (e.g., zone Z5) may cause controller 38 to restrict operations of more than a single machine.

The embodiment described above can be used to restrict and regulate machine operations in a relatively simple and cost effective manner. In this regard, specification of machine zones is relatively inexpensive and machine zone boundaries can be altered relatively quickly and relatively inexpensively by simply altering the map of zones stored in database 40. In addition many different machine zones may be specified for each machine so that varying degrees of regulation are enforced as a function of WID location.

Moreover, referring again to FIG. 13, it should be appreciated that different machine operation sub-sets or regimens may be specified for different WIDs for the same zone. Thus, for instance, when WID#1 is in zone Z1*m*, AS 198 allows machine M1 to perform regimen operations 1-6 and 9 while machine M1 operations are restricted to smaller ROS including regimen operations 1-2 and 4 when WID#2 is in zone Z1*m*.

While the example above assumes an AS 198 that associates WID identifiers or numbers with zones, machines and operation sub-sets, it should be appreciated that other embodiments may include an AS 198 that associates specific WID user identifiers (e.g., a users name, identification number, etc.) with zones, machines and operation sub-sets. In this case, instead of transmitting a WID identifier at block 90 to the access points 11, WID 30*a* may transmit a user identifier which is then used to identify appropriate regulated operation sub-sets as described above.

Moreover, in at least some embodiments, there may be different WID types where all WIDs of the same type are associated with the same AS ROS. For instance, in some facilities, there may only be two WID types including a maintenance type and a machine operation's type. In this case the AS would only include first and second different sections corresponding to the maintenance and operation's types, respectively, and controller 38 would associate each WID with one of the two different types to determine which ROS to use.

While process 84 in FIG. 3 is described as one wherein system controller 38 performs most of the processing, it is contemplated that, in at least some embodiments of the invention, the WIDs may perform a portion of the processing. In this regard, referring again to FIG. 2*c*, transmitter 67 may be replaced by a transceiver that can both transmit information to access points 11 and can receive information from access points 11. Here WID 30*a* may be programmed to use access point signals to identify WID 30*a* location, determine if WID 30*a* is in a machine zone and, where WID 30*a* is in a machine zone, identify a sub-set of machine operations in an AS and provide the sub-set to controller 38 for machine control purposes. In this case, referring again to FIG. 13, at least the segment of AS 198 that corresponds to a specific WID 30*a* is stored in the WID memory 69. For instance, with respect to WID#1 in column 200 of FIG. 13, AS segment 217 is relevant to WID#1 and therefore segment 217 is stored in memory 69. In addition, in this embodiment, the zone map (see FIG. 1) is stored in WID memory 69 along with a WID location determining program.

Figure 4:
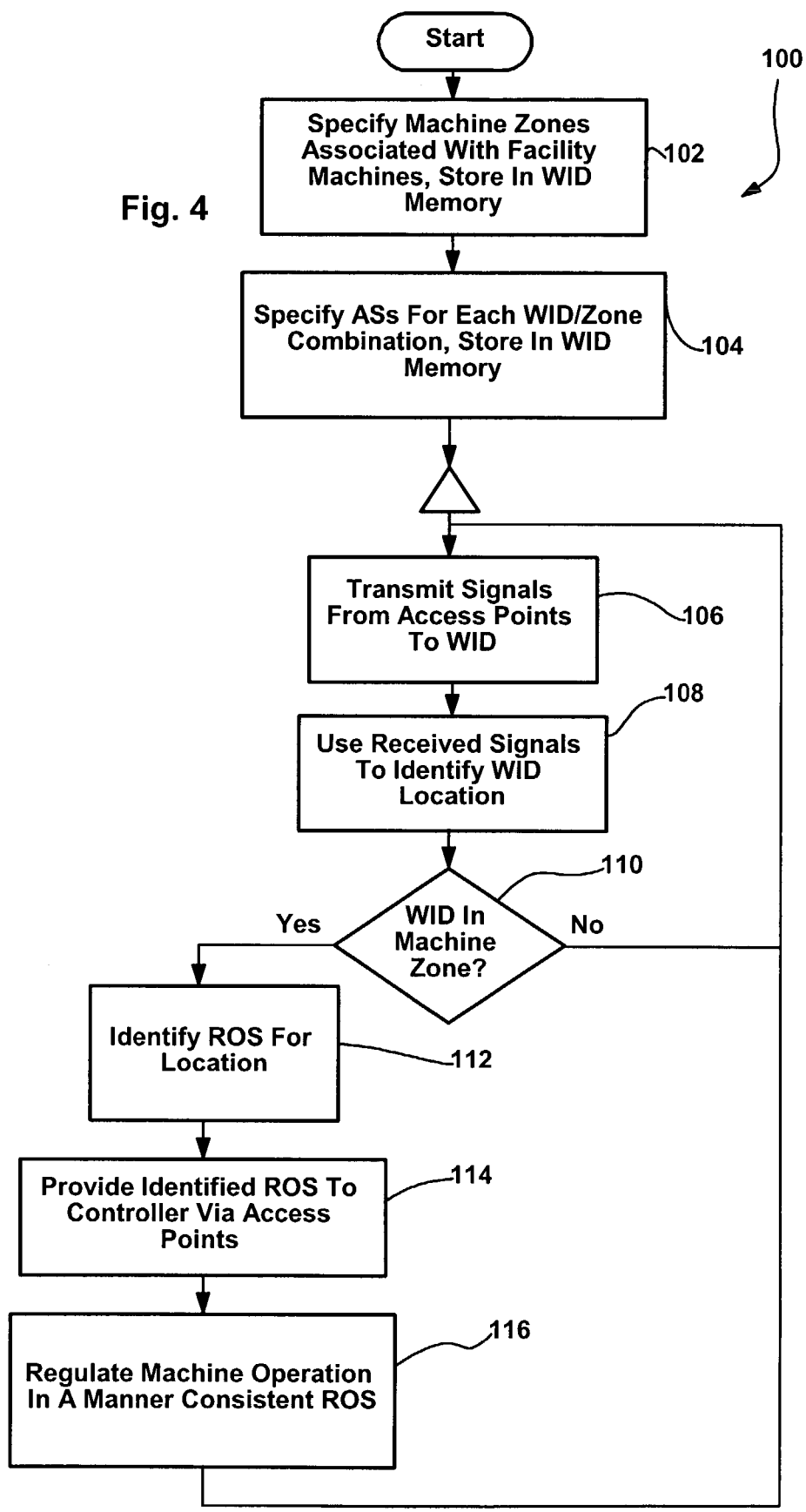
FIG. 4 is similar to FIG. 3, albeit illustrating another method according to the present invention.

Referring now to FIG. 4, a process 100 whereby WID#1 identifies a ROS is illustrated. Referring also to FIGS. 1 and 13, at block 102, a facility machine zone map is specified and stored in memory 69 of WID#1. At block 104, AS segment 217 corresponding to WID#1 is specified and stored in memory 69.

At block 106, controller 38 causes access points 11 to transmit signals to the transceiver (e.g., 67 in FIG. 2*c*) on WID#1. At block 108 WID processor 71 uses the received signals to identify WID#1 location within facility 10. At block 110, WID processor 71 accesses the machine zone map in memory 69 and compares the identified WID#1 location to the map machine zones. Where WID#1 is not located within a machine zone, control passed back up to block 106 where the cycle including blocks 106,108 and 110 is repeated.

Where WID#1 is located within a machine zone, control passes from block 110 to block 112 where WID processor 71 identifies the ROS in column 206 for each of the machines in column 204 corresponding to the WID/zone combination in columns 200 and 202. For instance, again, where WID#1 is in machine zone Z4, WID processor 71 identifies a ROS including machine operations 1 and 2 for machine M1.

At block 114, WID processor 71 transmits the identified ROS via transceiver 67 to access points 11 and thereby to system controller 38. At block 116 controller 38 regulates machine operation in a manner consistent with the received ROS. After block 116, control passes again back up to block 106 where WID location is again determined in the manner described above.

Other divisions of processing requirements are also contemplated such as, for instance, a method whereby WIDs identify their locations based on signals from access points 11 and provide their locations to controller 38 via WID transceivers and access points 11. Thereafter, controller 38 compares WID locations to a machine zone map in database 30 to determine which, if any, WIDs are located within machine zones and then regulates machine operations accordingly.

Referring once again to FIG. 13, in embodiments where the only secondary criteria is WID/user identity, the "ALL" indicators in column 206 indicate that when a WID in column 200 is in the zone in column 202, the machine in column 204 may perform all of the operations that the machine is capable of performing during normal operations and there is no restricted operations sub-set. Thus, for instance, when WID#1 is located in zone Z5 and outside the more restrictive zones that are inside zone Z5, machine M1 may perform any of its normal operations as indicated in column 206. In other embodiments described hereafter, where machine operations are premised on other secondary criteria or characteristics, the "ALL" indicators combined with the secondary criteria amount to a ROS.

In column 206 the "None" indicators are used to indicate that, when the associated WID in column 200 is in the zone in column 202, the machine in column 204 is halted. Thus, when WID#3 is in zone Z1m, machine M1 is halted.

As described above, in addition to enforcing presence based machine regulations for each facility machine, it is contemplated that, in at least some embodiments of the invention, controller 38 and associated system components may also be used to enforce rules based on secondary criteria. For example, a facility may adopt a rule that when more than one facility employee is located within a machine zone, machine operation should be limited or regulated in a different fashion than when a single employee is within the zone. Similarly, a facility may adopt a rule that when a first employee is in a first zone, when a second employee is in a second zone, machine regulations should be restricted differently than when no employees are in the second zone. One other rule may be that when one employee is within a physically barriered (e.g., caged) zone and a second employee passes through an entry into the zone, machine regulation must be altered.

With respect to multiple person/WID rules, referring again to FIG. 13, authorization specification 198 may include second WID limitation column 208 which indicates additional restrictions corresponding to each machine operation sub-set in column 206. For example, referring also to FIG. 1, when WID#1 in column 200 is in machine zone Z3 in column 202, the "Yes" indicator in column 208 indicates that when a second WID is within machine zone Z3, machine M1 operations must be further regulated.

Herein, to simplify the present explanation, it will be assumed that further machine regulation includes a first regimen including halting all associated machine operations so that no machine functions are performed. For instance, where a second WID is within zone Z3, instead of enabling machine M1 to perform machine operations 1-3 as indicated by the regimen in column 206, machine M1 operations are completely stopped. While further limitation is assumed to include halting all machine operations in this explanation, other less draconian regulations are contemplated. For instance, although not illustrated, in some embodiments, when a second WID in addition to WID#1 is located in zone Z3, machine M1 operations may be restricted to a sub-set or regimen of operations 1-3 (e.g., perhaps only machine operation 2). Herein the phrase "first regimen" will always be used to refer to the more restrictive of two regimens, the phrase "second regimen" will refer to a regimen more restrictive than a "third regimen" and so on.

The qualifier (Z#) that follows each "Yes" indicator in column 208 indicates the zone that is monitored for second WID presence when the WID in column 200 is in the zone identified in column 202. For instance, referring still to FIG. 13, and also to FIG. 1, when WID#1 in column 200 is in zone Z4, the qualifier zone monitored for second WID presence includes larger zone Z1m such that machine M1 operations are halted whenever a second WID is located within zone Z1m. Hereinafter the zone identified after a "Yes" indicator in column 208 will be referred to as a "qualifier zone."

Referring still to FIG. 13, a "No" indicator in column 208 indicates that when a WID in column 200 is in the zone in column 202 there is no second WID limitation. For instances, when WID#1 is in zone Z1m controller 38 allows machine M1 to perform operations 1-6 and 9 independent of the locations of other WIDs within facility 10 (e.g., a second WID may be located in zone Z1m without halting machine M1 operations 1-6 and 9).

Nevertheless, it should be appreciated that when a second WID is located in a machine zone, the portion of AS 198 associated with the second WID and zone may be used to restrict machine operations even if the portion of AS 198 associated with first WID#1 does not include a second WID limitation. For instance, while there is no second WID limitation when WID#1 is in zone Z2, when WID#2 is in zone Z2 there is a second WID limitation whenever another WID is within qualifier zone Z1m. Referring to FIG. 1, zone Z1m includes zone Z2 and therefore the second WID limitation corresponding to WID#2 in zone Z2 restricts M1 operations when WID#1 is within zone Z2.

In embodiments that consider secondary criteria along with WID location to determine how to regulate machine operations, it should be appreciated that the restricted operations sub-set is defined by the combination of both the operations in column 206 and the secondary criteria. For instance, where WID#1 is in zone Z4, the ROS limits machine M1 to perform operations 1 and 2 only when there is no second WID within zone Z1m. Similarly, when WID#1 is in zone Z5, the ROS specifies that machine M10 can perform any of its normal operations only if there is no second WID within zone Z5. Hereafter where other secondary criteria are used to regulate, those secondary criteria form part of the ROS.

Figure 5:
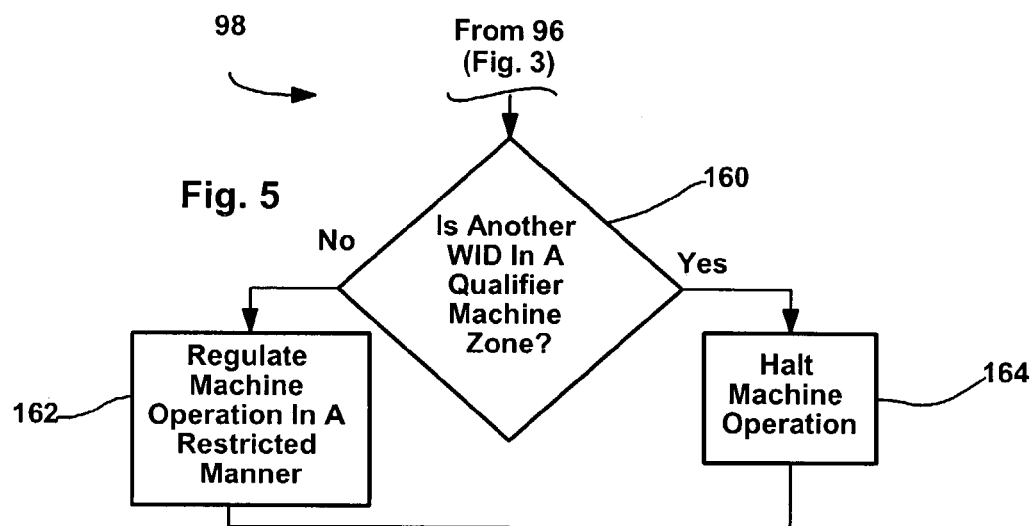
FIG. 5 is a flow chart illustrating a sub-process which may be substituted for a portion of the process in FIG. 3.

Referring now to FIG. 5, an exemplary sub-process that may be substituted for block 98 in FIG. 3 for limiting machine operations as a function of second WID presence within a qualifier machine zone is illustrated. Referring also and again to FIGS. 1 and 3, a machine zone map similar to the schematic of FIG. 1 is defined and stored as described above at block 86. At block 88, referring also to FIG. 13, an exemplary AS 198 including columns 200, 202, 204, 206 and 208 is specified and stored in database 40. At blocks 90 and 92 location of first WID#1 within facility 10 is determined. At block 94, when WID#1 is within a machine zone, as specified in the machine zone map, control passes from block 94 to block 96. At block 96 controller 38 identifies the ROS for the WID/zone combination and then control passes to block 610 in FIG. 5.

At block 160 controller 38 determines if a second WID is within a qualifier machine zone corresponding to the WID#1/zone combination. For example, in FIG. 13, when WID#1 is in zone Z4, controller 38 determines if a second WID is in the qualifier machine zone Z1m (i.e., see qualifier in column 208 corresponding to WID#1 in zone Z4 in columns 200 and 202, respectively). In the above example, where a second WID is in qualifier zone Z1m, control passes to block 164 where all machine M1 operations are halted. After block 164 control passes back to block 90 in FIG. 3. Where there is not a second WID in qualifier zone Z1m, control passes from block 160 to block 162 where machine M1 operation is regulated to restrict machine operations to operations 1 and 2 as specified in column 206. After block 162 control passes back to block 90 in FIG. 3.

Referring again to FIG. 13, if WID#1 is in machine zone Z1m or any other zone that does not have a second WID limitation, at block 160 in FIG. 5, because there is no qualifier machine zone and hence no other WID can be present in the qualifier zone, control simply passes to block 162 where machine operations are regulated according to the regulated operations sub-set specified in column 206.

As indicated above the multiple person or WID restrictions may also include restricting machine operations when a second person enters a qualifier zone regardless of whether or not the second person is carrying a WID. In this regard, referring again to FIG. 1, assuming zone Z1m is physically barriered and has only one entry path 20 that is equipped with a light curtain for sensing when a person passes therethrough. Also assume that a facility employee using WID#1 is located within machine zone Z4. In this case, instead of regulating machine M1 operations as a function of presence of a second WID in zone Z1m (see column 208 in FIG. 13), machine M1 operations may be regulated as a function of whether or not the light curtain sensor senses movement through entry path 20 which may be assumed to be a person passing into zone Z1m. When a second person passes through the light curtain, machine M1 operations may be halted. Sensors other than a light curtain are contemplated. Thus, the multiple person aspect of the present invention needn't require more than one WID to perform useful functions.

One other example of restricting machine operations as a function of WID location and secondary criteria includes regulating operations as a function of whether or not a WID has been enabled via successful association with either a specific person or with a person having a specific skill set. In this regard, it is contemplated that there may be an enablement process that must be performed in order to enable a WID and allow a WID to authenticate a WID user to system controller 38. Where enablement is required and the enablement process is not successfully completed, controller 38 may regulate machine operations appreciably or halt operations altogether when a non-enabled WID is present within a machine zone.

Referring once again to FIGS. 2a and 2c, yet another embodiment of the present invention includes the components described above with respect to FIGS. 2a and 2c and, in addition, includes some type of input device that allows a WID user to identify himself in an unambiguous manner so that a specific WID a can be associated with the particular user and enabled to perform the functions described above. For example, one exemplary input device may include a biometric indicia reader such as, for instance, a fingerprint reader 79 that resides either on the front surface 39 of WID 30a or, in the alternative, may reside on back surface 65. Indicia reader 79 is linked to processor 71 so that processor 71 can obtain information therefrom.

Instead of providing a biometric indicia reader, the input device for receiving user identifying information may include some type of a keyboard or the like that allows the WID user to enter a user name and/or password that can be used to unambiguously identify the specific user. Although not illustrated, the keyboard or other input device may be part of WID 30a or, in the alternative, may be linked to a workstation or the like that is used to perform the authentication process and to enable the WID 30a to perform its portion of the locating and identifying processes described above and hereinafter. Hereafter, although many different input devices are contemplated, to simplify this explanation, the invention will be described in the context of a WID 30a including a fingerprint reader 79. Here, it is also assumed that each WID is used by a specific facility employee and that the employee's fingerprint information is stored in the employee's WID memory 69 for comparison to a fingerprint obtained during subsequent enablement processes.

Referring once again to FIG. 13, WID enable limitation column 210 indicates, for each of the WID/zone/associated machine combinations in columns 200, 202 and 204, respectively, whether or not particular WIDs in column 200 have to be enabled for machine operations in column 206 to be performed when the WID in column 200 is in the machine zone in column 202. For instance, the "No" indicator in column 210 corresponding to WID#1, machine zone Z1m and associated machine M1 in columns 200, 202 and 204 indicates that WID#1 does not have to be enabled when in zone Z1m for machine M1 to perform machine operations 1-6 and 9. However, the "Yes" indicator in column 210 corresponding to WID#1, zone Z4 and machine M1 in columns 200, 202 and 204, respectively, indicates that WID#1 must me enabled when in machine zone Z4 for machine M1 to perform machine operations 1 and 2. Similar indicators are provided in column 210 for each WID/machine zone/associated machine combination in columns 200, 202 and 204, respectively.

Figure 6:
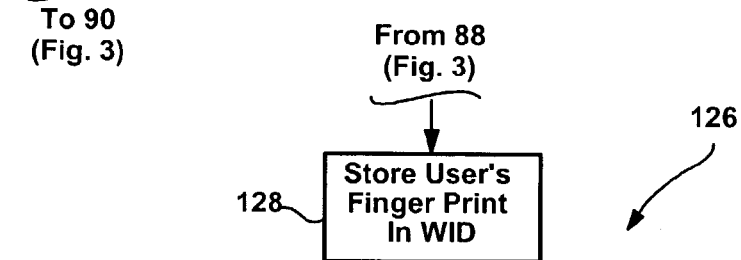
FIG. 6 is a flow chart illustrating a sub-process for enabling a wireless information device according to the present invention which may be added to the process of FIG. 3.

Referring now to FIG. 6, an enablement subprocess 126 that may be added to process 84 of FIG. 3 is illustrated. Subprocess 126 is meant to be performed between blocks 88 and 90 of process 84. In FIG. 3, after a machine zone map has been specified and stored at block 86, at block 88 an AS 198 including, in at least one embodiment, columns 200, 202, 204, 206 and 210 in FIG. 13, is specified and stored in system data base 40. After block 88 control passes to block 128 in FIG. 6 where the WID user's fingerprint information is stored in the user's WID memory 69. All of the specifying and storing described above is performed during a system commissioning process as described above.

When a facility employee wishes to use WID#1 within facility 10, at block 130, the user places his finger on indicia reader 79 and WID processor 71 obtains the user's fingerprint. At block 132, processor 71 compares the obtained fingerprint with the stored fingerprint to determine whether or not the two fingerprints match. Where the two fingerprints do not match, processor 71 control passes to block 140 where processor 71 disables first WID#1. However, at block 132, when the two fingerprints match, control passes block 134 where processor 71 enables first WID#1. After each of blocks 134 and 140, control passes back to block 90 in FIG. 3.

As above, at blocks 90 and 92, WID location within facility 10 is determined and at block 94, system controller 38 determines whether or not WID#1 is within a machine zone. Where WID#1 is within a machine zone, control passes block 96 where controller 38 identifies a ROS for WID#1 and the specific machine zone combination.

Referring now to FIG. 7, a subprocess 137 for enforcing the enablement requirements of AS 198 that may be included between process blocks 96 and 98 in FIG. 3 is illustrated. After block 96 in FIG. 3, control passes to block 139 in FIG. 7 where controller 38 uses the information in column 210 of AS 198 to determine whether or not enablement is required, for WID#1 in the zone in which WID#1 currently resides for the operations sub-set inn column 206 to be performed by the machine in column 204. For instance, where WID#1 resides in machine zone Z1m, column 210 in FIG. 13 indicates that no enablement is required. In this case, control passes from block 139 to block 98 in FIG. 3 where machine M1 operation is regulated in a manner consistent with the machine operations (e.g., 1-6; 9) specified in column 206.

As another instance, referring again to FIG. 13, where WID#1 resides in zone Z4, column 210 indicates that WID#1 must be enabled for machine M1 to perform the operations listed in column 206 and therefore, at block 139, control passes to block 144. At block 144, controller 38 determines whether or not WID#1 is enabled. Where WID#1 is not enabled, control passes to block 148 where machine operations are halted. After block 148 control passes to block 130 in FIG. 6 where the enablement process may again be performed. At block 144, where WID#1 has been enabled, control passes back to block 98 in FIG. 3 where, once again, machine M1 operations are regulated in a manner consistent with the machine operations specified in column 206 of AS 198 in FIG. 13.

Referring again to FIG. 13, the subprocess of FIG. 7 is performed independently for each machine in column 204 that is associated with an existing WID/zone combination. For instances, according to AS 198, when WID#1 is located in zone Z5, each of machines M7 through M11 may be regulated by controller 38. Thus, the FIG. 7 sub-process is performed for each of machines M7 through M11. For each of machines M7 and M9 through M11 a "Yes" indicator in column 210 means control passes from block 139 to block 144 where WID enablement status is determined. For machine M8 the "No" indicator in column 210 means control passes from block 139 to block 98 so that even when WID#1 is not enabled, machine M8 will continue to be able perform all normal machine M8 operations.

WID enablement may also be limited by some type of additional requirements designed to ensure that once a WID is associated with a specific user and is enabled, the WID remains associated with the WID user and that the WID be disabled if there is some indication that the association has been broken. In this regard, it is assumed generally that WIDs will only be issued to facility employees and that the employees will use their best efforts to follow facility guidelines and not purposefully attempt to get around those guidelines. Thus, for instance, it may be inappropriate for a first WID user to allow some other person to use the first user's WID to gain access to machine zones while machines are performing regulated operations. Here, upon WID enablement, the WID may be programmed to monitor for some event indicating potential disassociation with the WID user that enabled the WID. For instance, assuming that a WID has been secured to a user's shirt via a pin (see 73 in FIG. 2b) or the like, it may be assumed that when pin 73 is opened, WID 30a is being removed from the user's shirt and disassociation may be presumed. Here it may be appropriate to disable WID 30a when a disassociation event occurs. WID 30a may be programmed to monitor other disassociating events such as momentary separation between a WID user and the WID 30a., etc.

Referring again to FIGS. 2b and 2c, WID 30a may include a disassociating sensor 83 for sensing a disassociating event. For instance, sensor 83 may include a sensor for sensing when pin 73 is decoupled thereby facilitating removal of WID 30a from a user's shirt or the like. In the alternative, where suitable, a proximity sensor such as a capacitive coupling 93 may be provided that actually measures proximity of WID 30a to a user's body. Capacitive coupling type sensors are well known in the computing arts generally and will not be described here in detail. Other disassociating sensors are contemplated.

The disassociating sensor 83 is linked to WID controller 71 such that when a disassociating event occurs, processor 71 can disable the WID 30a. Here, where an AS 198 specifies that a specific WID must be enabled for operations to be performed when the WID is in a specific zone, the operations will be halted if the disabled WID is in the specific zone.

Referring once again to FIG. 13, WID enablement continuity limitation 214 indicates, for each WID/zone/associated machine combination in columns 200, 202 and 204, respectively, whether or not enablement continuity is required. For instance, with respect to the combination including WID#1, machine zone Z1m and associated machine M1 in columns 200, 202 and 204, column 214 includes a "No" indicator indicating that there is no enablement continuity limitation. Thus, referring again to FIG. 1, when WID#1 is located within machine zone Z1m, machine M1 operations are restricted to operations 1-6 and 9 and there is no requirement that WID#1 have remained enabled during the period between the enablement process and the time when WID#1 is located in zone Z1m. When WID#1 is located in zone Z4, column 214 includes a "Yes" indicator that indicates a continuity limitation. In this case, if WID#1 has been disassociated from the WID user between the time the enablement process was performed and the time at which WID#1 is located within machine zone Z4, all machine M1 operations are halted.

Referring now to FIG. 8, an exemplary subprocess 150 for disabling a previously enabled WID when likely disassociation is sensed is illustrated. The process in FIG. 8 is meant to be added to the end of the subprocess illustrated in FIG. 6. Thus, after either of blocks 134 or 140, control passes to block 136 in FIG. 8 where WID#1 monitors the disassociation sensor 83 to determine when a disassociation event occurs. At block 138, where no disassociation event occurs, control passes to block 90 in FIG. 3 and WID#1 remains enabled. However, at block 138, where a disassociation event occurs (e.g., decoupling of pin 73), control passes to block 152 where processor 71 disables WID#1 prior to control passing to block 90 in FIG. 3. As above, when WID#1 is disabled, controller 38 causes machines associated with the zone in which WID#1 is located to be halted (see again FIG. 7, in this regard).

Figure 9:
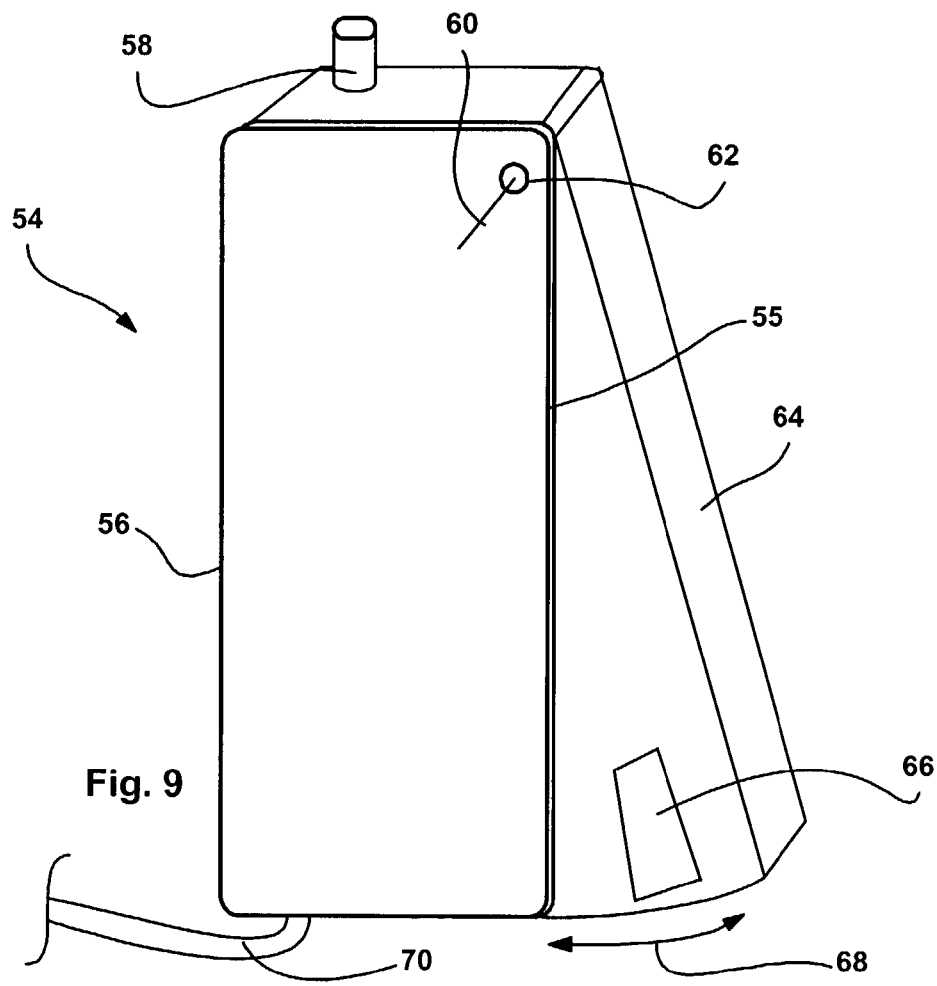
FIG. 9 is a perspective view of an operator device that may be used in conjunction with a wireless information device to perform various methods according to the present invention.

One other example of combining employee location and other information to regulate machine operations includes regulating operation as a function of both employee location and activation of a machine operator such as a deadman switch. In this regard, many facilities include technology that has been designed to enable employees to quickly halt machine operations when employees are within a restricted location and a hazardous condition occurs or when the employee looses control of machine operations. Referring to FIG. 9, one emergency stop system includes a machine operator device 54 that is tethered to a controller 38 via a flexible cord 70. Cord 70 is typically long enough to allow an operator to move within a physically barriered machine zone (e.g., Z1m in FIG. 1). The operator typically includes some type of spring loaded lever member 64 designed to be controllably activated by a user using a single hand. In FIG. 9, device 54 includes a rigid housing member 56 and lever 64 mounted for pivotal motion to a pin 62 disposed along a pivot axis 60. When not activated a lever spring (not illustrated) forces lever 64 into a deactivated position. Lever 64 includes two different ranges of activity, a partially activated range and a fully activated range. As the labels imply, when in the partially activated range, lever 64 is partially depressed against the force of the spring and when fully activate the lever is fully depressed against the force of the spring. In FIG. 9, a partial activation range is earmarked by indicia 66 such that a user can easily visually identify partial activation which is achieved when a housing edge 55 is adjacent any part of indicia 66.

The operator includes a sensing device that senses the degree of lever activation. For the purposes of this explanation the term "activated" will be used in the context of a machine operator to refer to an operator where lever 64 is within the partially activated range 66. As is common in the controls industry, when the operator is activated, machine operations are facilitated. However, when the operator is deactivated (e.g., the lever is either released or fully depressed) controller 38 halts machine operations.

An operator device 54, and, more specifically, activation of an operator device 54 can be used in conjunction with WID location information to regulate machine operations. For instance, on one hand, for some WID users there may be no requirement for operator activation to allow a machine to continue performing various operations when the WID and associated user are located within a specific machine zone. On the other hand, for other users, operator device 54 may have to be activated when the user and an associated WID are located within a specific zone associated with the machine. For some users machines may be regulated according to a first set of operations if an operator device 54 is activated and according to a second set of operations if the operator device 54 is not activated.

Referring once again to FIG. 13, operator limitation column 215, as its label implies, indicates whether or not an operator device (e.g., 54 in FIG. 9) has to be activated for each WID/machine zone/associated machine combination in columns 200, 202 and 204 for machine operations in column 206 to be performed. For example, referring also to FIG. 1, when WID#1 in column 200 is located in machine zone Z1m, the "Yes" indicator in column 215 indicates that operator device 54 must be activated for machine M1 to perform any of machine operations 1-6 and 9. Similarly, when WID#1 in column 200 is in machine zone Z5, machine M7 will perform all of its possible operations whether or not an operator device 54 is activated while machine M11 will only perform operations 7-9, 11 and 18 if operator device 54 is activated.

Figure 10:
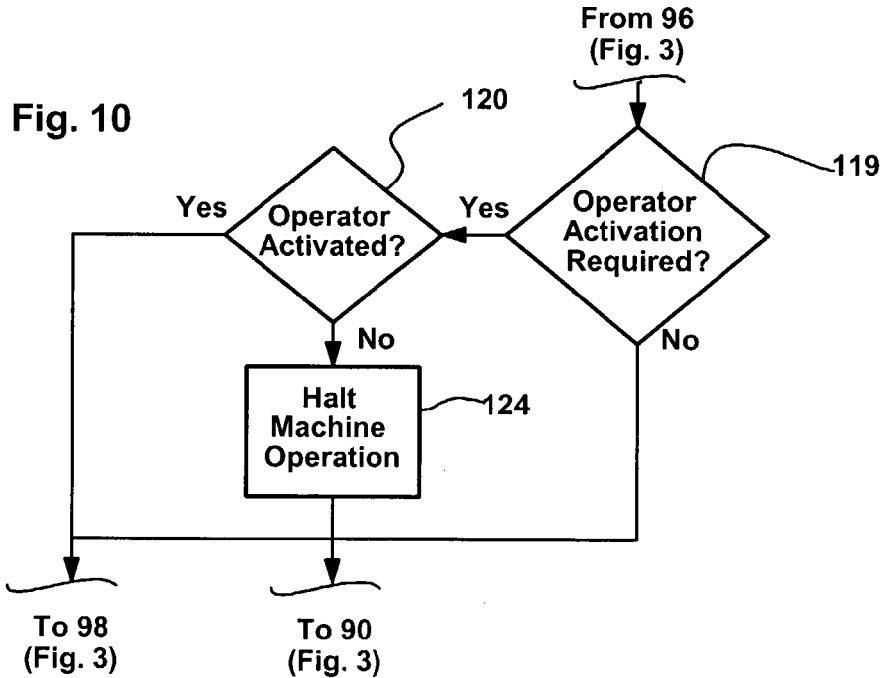
FIG. 10 is a flow chart illustrating a sub-process for determining whether not an operator has been activated and then controlling machine operation as a function thereof which may be added to the process of FIG. 3.

Referring now to FIG. 10, an exemplary subprocess that restricts machine operations as a function of operator device activation and that may be added between process blocks 96 and 98 in FIG. 3 as illustrated. Referring also to FIG. 3, after a machine zone map has been specified and stored at block 86, control passes to block 88 where an AS 198 including, in at least one embodiment, columns 200, 202, 204, 206 and 215, is specified and stored in system 40. Next, at blocks 90 and 92, controller 38 determines WID#1 location. At block 94, if WID#1 is located within a machine zone, control passes to block 96 where controller 38 identifies a machine operation set for each machine in column 204 corresponding to the WID/zone combination. Next, control passes from block 96 to block 119 in FIG. 10 where controller 38 accesses AS 198 to determine, for each machine in column 204 that is associated with WID#1 and the machine zone in which WID#1 resides, whether or not an operator device has to be activated for machine operations in column 206 to be performed. Where operator device activation is not required, control passes to block 98 in FIG. 3 and controller 38 regulates machine operation in a manner consistent with the machine operations identified in column 206. Where operator activation is required at block 119, control passes to block 120.

At block 120 controller 38 determines whether or not an operator device 54 is activated. Where an operator device 54 is not activated, control passes to block 124 and machine operation is halted. After block 124 control passes back to block 90 in FIG. 3. Where operator device 54 has been activated at block 120, control also passes to block 98 where controller 38 regulates machine operation in a manner consistent with the information in column 206.

The process of FIG. 10 is either simultaneously performed for each machine associated with the machine zone that WID#1 resides in, in the alternative, is consecutively performed for each of the associated machines. For example, when WID#1 is in zone Z5, five separate machines M7, M8, M9, M10 and M11 listed in column 204 are associated with the WID#1 location. Thus, the process of FIG. 10 is performed five times, a separate time for each of the associated machines M7 through M11 as the operator limitation is machine dependent.

While each of the limitations in columns 208, 210, 214 and 215 are described as being machine specific and machine dependent, it should be appreciated that some embodiments may include limitations that are not machine dependent and that, instead, apply across the board to all machines associated with a specific machine zone. For example, the operator limitation in column 215 may be such that, for every machine zone, some type of an operator must be activated for machine operations to be performed while a WID is located within the zone. In this case, where an operator device 54 is activated when a WID enters a zone but is deactivated thereafter, all of the machines associated with the zone would be halted.

Yet one more example of combining employee location and secondary criteria to regulate machine operations is included in some embodiments of the present invention where controller 38 predicts future WID and user location and regulates machine operations as a function thereof. This concept is particularly useful in the case of multiple zones associated with a single machine such as, for example, in the case of zones Z1m, Z2, Z3 and Z4 associated with machine M1 in FIG. 1. To predict future location controller 38 may simply identify a current trajectory and velocity via two simultaneous location determinations. Other more complex location predicting algorithms and processes are contemplated.

Figure 11:
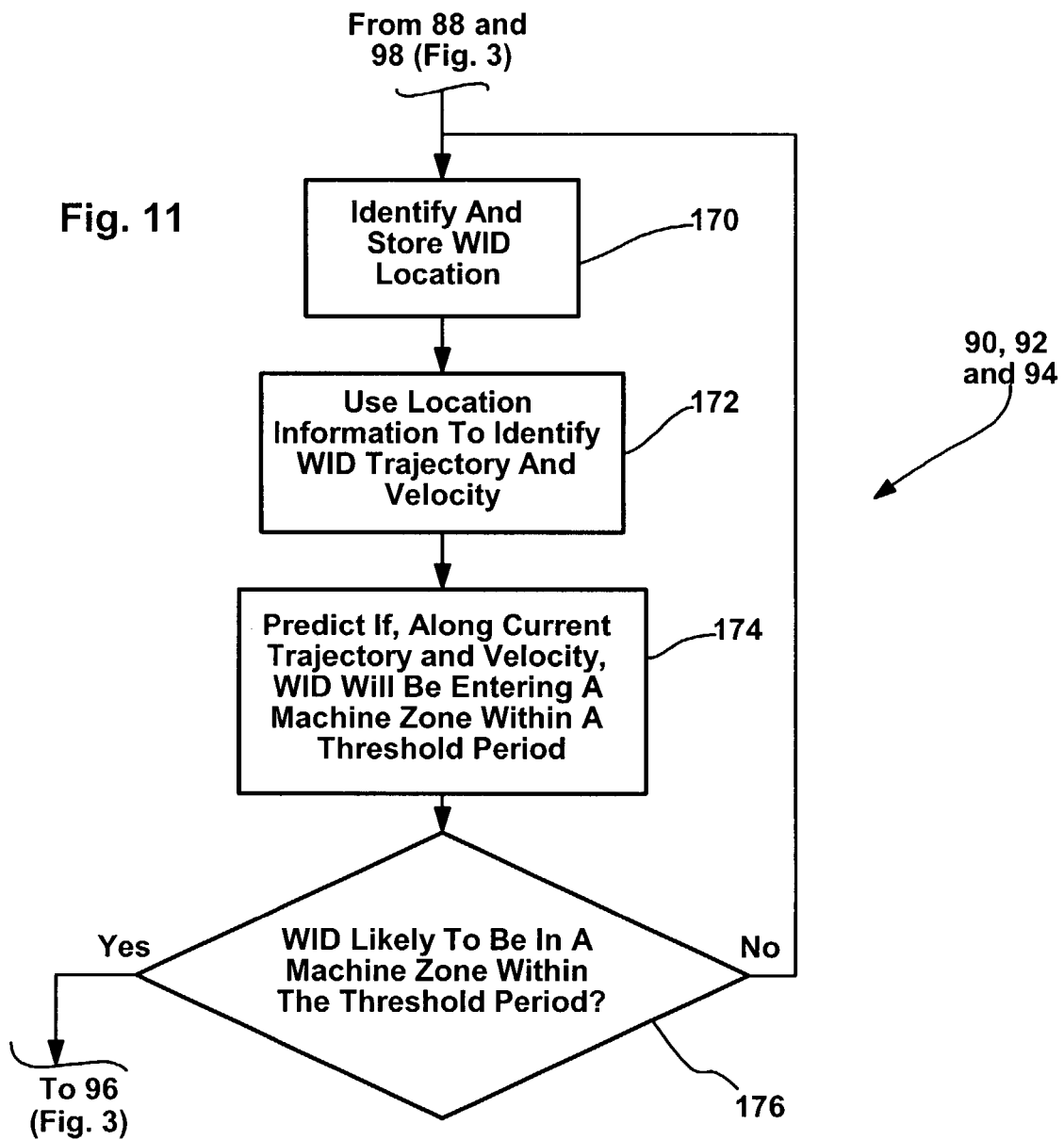
FIG. 11 is a sub-process for predicting future wireless information device location and modifying machine operation as a function thereof which may be added to the process of FIG. 3.

Referring now to FIG. 11, an exemplary subprocess for predicting WID location that may replace blocks 90, 92 and 94 in FIG. 3 is illustrated. In FIG. 3, after the machine zone map has been stored at block 86 and the AS 198 has been stored at block 88, control passes to block 170. At block 170 controller 38 determines WID#1 location in a manner similar to that described above and the location is stored. Next, after at least two consecutive WID locations have been identified, at block 172, controller 38 uses the location information to identify a WID trajectory and velocity. Trajectory may be determined by assuming travel along a straight line passing through the two locations and along a direction consistent with travel from the earliest of the two locations toward the most current location. Velocity may be determined by dividing the distance between the most recent two locations by the period between the two location determinations.

At block 174, controller 38 predicts whether or not, along current trajectory and velocity, WID#1 will be entering a machine zone within a threshold period (e.g., 1-2 seconds). In at least some embodiments the threshold period is selected to be a similar to the location sampling period. At block 176, where WID#1 is not likely to be entering a machine zone within the threshold period, control passes back up to block 170 where the location determining process and the prediction process corresponding to blocks 170, 172 and 174 are again performed.

At block 176, where WID#1 will likely enter a machine zone within the threshold period, control passes to block 96 in FIG. 3 where controller 38 assumes that WID#1 is already within the zone that WID#1 will likely enter. Thus, at block 96 controller 38 identifies an operation set corresponding to the WID/zone combination likely to occur and at block 98 machine operations are limited or regulated accordingly. For instances, referring again to FIG. 1, assume that the user of WID#1 is approaching zone Z5 and that controller 38 determines that within one threshold period WID#1 will be within zone Z5. In this case, referring also to FIG. 13, controller 38 accesses AS 198 and determines that operations of each of machines M9 and M11 should be regulated and controls each machine accordingly.

It has been recognized that, for certain applications, some of the technology described above may be prohibitively expensive. For example, while at least one embodiment involved is described as including a proximity sensor which senses when a WID is momentarily removed or separated from a WID user, such a proximity sensor may be prohibitively expensive for certain applications. Nevertheless, in some applications ensuring that only specific facility employees are present within machine zones when specific machine operations occur is particularly important.

To ensure that only specific WID users enter machine zones in a relatively less expensive fashion, according to at least one embodiment of the invention the system may be programmed to require that a WID enablement process be performed just prior to entering a machine zone or, in the alternative, periodically as a facility employee moves about facility 10. For example, referring once again to FIG. 1, an authorization zone A1 corresponding to machine zone Z1m is illustrated and is provided adjacent entry path icon 20. Here, it will be assumed that authorization zone A1 is a relatively small zone in which a WID must be enabled prior to entering zone Z1m through path 20 for any machine M1 operations to be performed while a person is inside zone Z1m.

Figure 12:
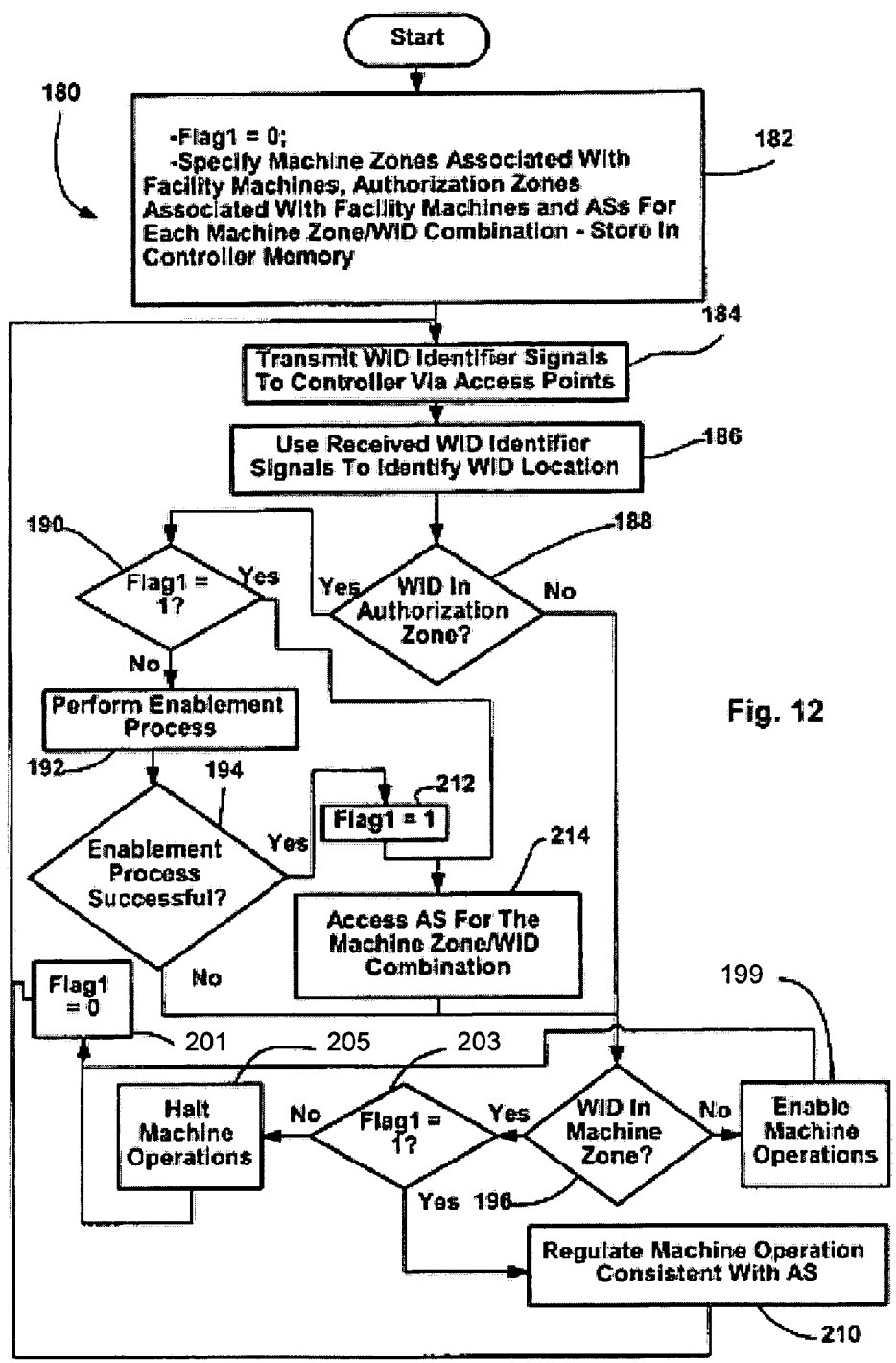
FIG. 12 is a flow chart illustrating another process according to the present invention.

Referring also to FIG. 12, an exemplary process 180 that requires enablement within an authorization zone like zone A1 in FIG. 1 prior to allowing machine operations to be performed while a person is in a zone is illustrated. In the process of FIG. 12, contrary to some of the information in FIG. 13, it will be assumed that the AS employed by controller 38 requires WID enablement for every facility machine to perform operations when a WID is located in an associated machine zone. Thus, the AS used with the FIG. 12 process includes "Yes" indicators throughout column 210 and machine operations are halted whenever a non-enabled WID is located within a machine zone associated with a specific machine.

Referring also to FIG. 1, at block 182, a Flag1 which indicates whether or not WID#1 is currently enabled is set equal to zero to indicate that, initially, WID#1 is not enabled. It is contemplated that there would be a different Flag1 for each WID used in facility 10. In process 180, when Flag1 is set equal to 1, the flag indicates that WID#1 has been enabled.

In addition, at block 182, machine zones associated with facility machines are specified in a map and stored in data base 40. In process 180, after a WID has been enabled within zone A1, the WID user can access machine zone Z1m and at least a sub-set of machine M1 processes may be performed. In addition, as long as a WID remains in either zone Z1m or authority zone A1, after the WID has been enabled, the WID will remain enabled but, if the WID is removed from zones Z1m and A1, the WID will be disabled. After a WID is disabled, a new enablement process will have to be performed prior to re-entering zone Z1m if the WID user wishes to have at least some machine M1 processes performed while the user is in zone Z1m. Also, at block 182, authorization zones like zone A1 in FIG. 1 corresponding to machine zones are specified and stored in data base 40 as well as ASs like specification 198 in FIG. 13.

At block 184 WID#1 transmits WID identifier signals to controller 38 via access points 11. At block 186, controller 38 determines WID#1 location as a function of the received WID identifier signals. At block 188 controller 38 determines whether or not WID#1 is inside one of the authorization zones (e.g., zone A1). Where WID#1 is not within an authorization zone A1, control passes to block 196 where controller 38 determines whether or not WID#1 is within one of the machine zones. Where WID#1 is not within a machine zone at block 196, control passes to block 199 and machine operation is completely enabled prior. After block 199 control passes to block 201 where Flag1 is set equal to zero prior to control passing back up to block 184.

Referring again to block 196, if WID#1 is within one of the machine zones, control passes to block 202 where controller 38 determines whether or not Flag1 is equal to 1. Where Flag1 is zero (and hence not equal to 1), because WID#1 is in the machine zone and has not been enabled, control passes to block 205. At block 205, machine operation is halted and control passes to block 201 where Flag1 is again set to zero prior to control passing back up to block 184. Thus, if the user of WID#1 simply walks through path 20 into zone Z1m in FIG. 1 without enabling WID#1, controller 38 halts machine M1 operations.

Referring once again to block 203, if Flag1 is equal to 1 indicating that WID#1 in the machine zone is enabled, control passes to block 210 where machine operations are regulated in a manner consistent with the AS employed by controller 38. After block 210, control passes again back up to block 184 and the process is repeated.

Referring once again to block 188, where a WID#1 is located within an authorization zone A1, control passes from block 188 to block 190. At block 190, where Flag1 is equal to 1 indicating that the WID within the authorization zone has already been enabled, control passes from block 190 to block 214 where the AS 198 (see again FIG. 13) for the specific WID/machine zone combination is identified as described above. Here, for instance, a WID user may perform an enablement process and remain within access zone A1 during one or more cycles through process 180 illustrated in FIG. 12. As another instance where Flag1 may be equal to 1 at block 190, a WID user may perform an enablement process in zone A1, enter zone Z1m and pass back into zone A1 either knowingly or unknowingly. In either case the WID, in at least this embodiment, stays enabled while it remains within either of zones A1 or Z1m.

Referring again to block 190, if Flag1 is zero and hence WID#1 is not enabled, control passes to block 192 where the user must perform an enablement process. When the user attempts to perform an enablement process, if the enablement process is unsuccessful, control passes from block 194 to block 196. Again, at block 196, where WID#1 is not located in the machine zone, control passes to block 199 where machine operations continue to be performed in the typical manner and control eventually passes back up to block 184 where the process is continued.

At block 194, however, if the enablement process is successful, control passes to block 212 where Flag1 is set equal to 1 indicating a successful enablement process. After block 212, control passes to block 214 where, controller 38 accesses the AS for the WID/machine zone combination. Thereafter, when WID#1 is moved into zone Z1m, controller 38 regulates machine M1 operations to allow only operations specified by the AS.

Many other processes may be performed with the inventive system wherein two or more limiting secondary criteria are used in conjunction with WID presence within a zone to regulate machine operations. For instance, the enablement requirement and an operator device activation requirement may be combined to limit machine operations such that operations are halted where a WID in an associated zone is disabled or an operator device is not activated. To support this limiting combination AS 198 in FIG. 13 may include columns 200, 202, 204, 206, 210 and 215. In FIG. 13, for example, when WID#1 is within zone Z4, machine M1 operations 1 and 2 may only be performed if WID#1 is enabled (see column 210) and an operator device like device 54 in FIG. 9 is activated (see column 215). Many other combinations of limitations are contemplated with several of the combinations represented in FIG. 13.

Moreover, controller 38 in FIG. 1 may be programmed to enforce specific timing requirements calculated to ensure that facility employees do not inadvertently cause operator device activation. For example, one timing requirement may be that an operator device (e.g., 54) must be activated within a short threshold period or time limit $T_{lim}$ after a WID is enabled for the WID to remain enabled. Referring now to FIG. 14, an exemplary subprocess that may be performed between block 212 (and 190) and block 214 in FIG. 12 is illustrated that can be used to enforce an operator device activation timing requirement. Referring also to FIG. 12, after block 194, if the WID enablement process is successful, Flag1 is set equal to 1 at block 212 to indicate that the WID has been enabled. After block 212 control passes to block 250 in FIG. 14.

At block 250, if the operator device 54 is activated control passes to block 252 where a time counter T1 is set equal to zero after which control passes back to block 214 in FIG. 12. Referring again to block 250, where the operator device 54 is not activated, control passes to block 254 where time counter T1 is compared to the time limit $T_{lim}$ (i.e., the period during which operator activation is expected). Where counter T1 is less than limit $T_{lim}$ control passes back up to block 250 where operator device activation is again monitored. Where counter T1 equals limit $T_{lim}$ and hence the operator device has not been activated in an expected time period, control passes to block 256 where the WID is again disabled and Flag1 is reset to a zero value. After block 256 control passes again to block 214 in FIG. 12. Here, as above, the process 180 of FIG. 12 would require a new enablement process prior to allowing any machine operations to be performed while a user is in a machine zone.

The present invention also contemplates WIDs having other forms and, in some cases, additional hardware that can be used to provide additional and enhanced functionality. To this end, referring to FIGS. 15a and 15b, a particularly useful WID embodiment 30b may take the form of a hand-held computing device such as a personal digital assistant or the like including more complex interface components. WID 30b includes a plastic or metallic housing 232 for protecting other WID components. The other components include a processor 271, a WID memory 269, a transceiver 238, one or more input devices such as a keyboard 36, dedicated buttons 240, a rocker type button 244 that controls the position of a curser 246, a finger print reader interface 242, on-screen cursor selectable icons 245, etc., a speaker 251 and a display screen 234. Processor 271 is linked to each of memory 269, devices 236, 244, 240 and 242, screen 234, speaker 251 and transceiver 238 and runs programs that may perform any of the method described above.

In addition, however, here it is contemplated that processor 271 may also be programmed to provide various types of information to a WID user via display screen 234 and/or speaker 251. For instance, when a WID user enters an authorization zone like zone A1 in FIG. 1, controller 38 may provide information to processor 271 causing processor 271 to provide a warning that enablement is required prior to entering zone Z1m and also providing instructions regarding how to complete the enablement process.

In addition, when a user first enters an authorization zone A1, processor 271 may provide an audible indication that the user's WID 30b has been moved into an authorization zone prompting the WID user to reexamine display 234 for additional information regarding the user's location. Other audible indications are contemplated such as, for instance, sounds generated to indicate movement from one machine zone to another. For instance, in FIG. 1, when a WID is moved from zone Z1m into zone Z2, a sound may be generated. Display 234 may be used to identify which zone a WID is located in and, perhaps also to provide a map akin to the FIG. 1 schematic to help orient a WID user with respect to facility machines and associated zones, WID locations may be indicated on the displayed map.

Another type of information that processor 271 may provide to WID users includes information regarding machine operation regulations. For instance, when a user enters a machine zone and machine operations are regulated, the user's WID may indicate the limited operation types that can be performed while the user is located in the zone. In addition, to avoid confusion, the WID may indicate machine operations typically performed by the machine that cannot be performed while the user is within the zone. Where WID enablement is required for operations to be performed and a WID is not enabled or, for some reason becomes disabled, the requirement may be indicated via display 234.

Thus, one general type of information that may be provided to WID users via WID 30b includes information tailored to help the WID user understand how and why machine operations are being regulated.

Another general type of information that may be provided via display 234 includes actual interface information for controlling facility machines. For instance, referring again to FIG. 13, when WID#1 is located in zone Z4, machine M1 operations are limited to operations 1 and 2. While M1 operations 1 and 2 may be performed, the AS ROS may require a WID user to manually control operations 1 and/or 2. In this case controller 38 may provide information to WID#1 to configure WID#1 to provide control interface tools for controlling operations 1 and 2. For instance, the control tools may include virtual buttons 245 on display 234 or specific earmarking of hardware buttons 240, 236, 244, etc.

Referring again to FIG. 13, one other column of information that may be included in AS 198 is a WID interface column 169. For each WID/zone combination in columns 200 and 202, AS 198 includes a separate WID interface specification. For instance, for WID#1 in zone Z1m, column 169 includes Spec1 while Spec2 is associated with the WID#2 and zone Z2 combination. Here the WID specifications each include programs that can be used to configure WIDs to either provide machine information to the WID user or to receive information such as machine commands from the user or to both receive information and provide information.

Figure 16A:
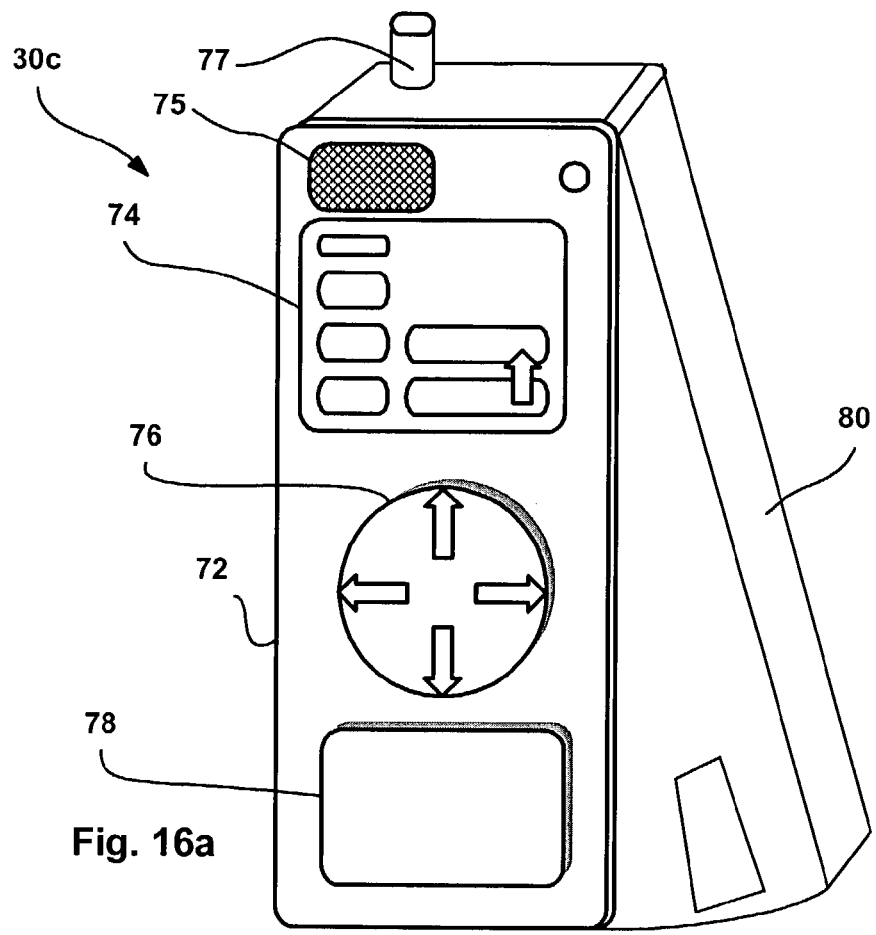
FIG. 16a is a perspective view of a third exemplary wireless information device according to the present invention.
Figure 16B:
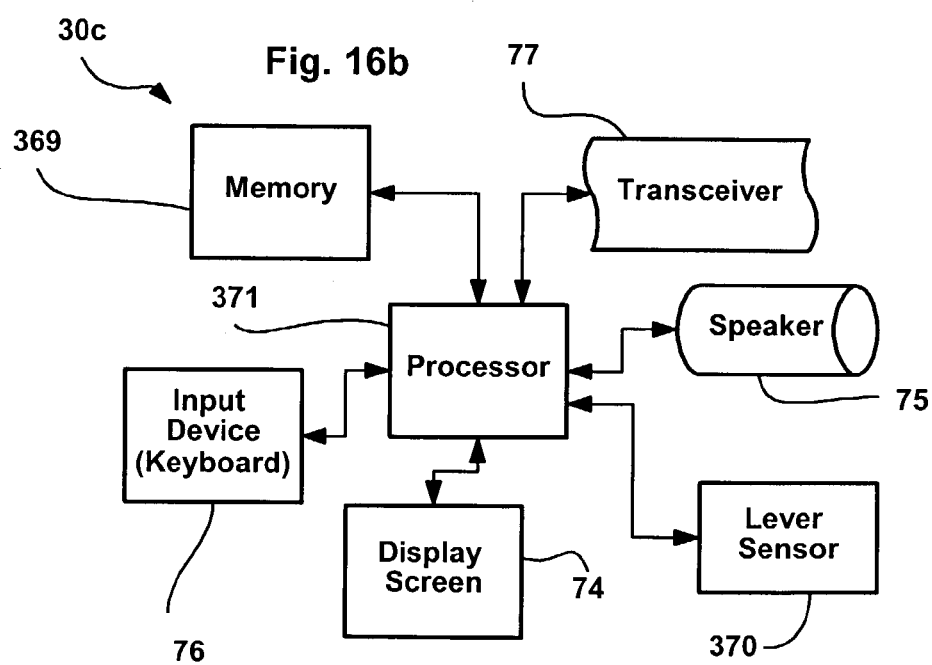

Referring now to FIGS. 16a and 16b, one other WID embodiment 30c is illustrated. WID 30c includes all of the components that WID 30b includes such as a housing 72 having a display 74, interface buttons 76, a finger print identifier 78, a speaker 75, a transceiver 77, a processor 371 and a memory 369. In addition, however, WID 30c also includes a spring loaded operator lever 80 and a lever activation sensor 370. Lever 80 and the corresponding sensor 370 are akin to the operator components illustrated in FIG. 9 and are provided to perform the same function as operator device 54. To this end, as illustrated in FIG. 16b, sensor 370 is linked to processor 371 to sense when lever 80 is activated. In embodiments of the invention that employ WID 30c, when lever 80 is activated, WID 30c transmits a signal to controller 38 indicating that the operator limitation of column 215 in FIG. 13 is met. Upon deactivation of lever 80, WID 30c transmits a "deactivated" signal to controller 38 indicating the deactivated status thereby causing controller 38 to regulate machine operations accordingly. One advantage with WID 30c is that cord 70 can be eliminated in FIG. 9. Another advantage is that multiple operators like the operator 54 in FIG. 9 can be replaced by WIDs.

Figure 17:
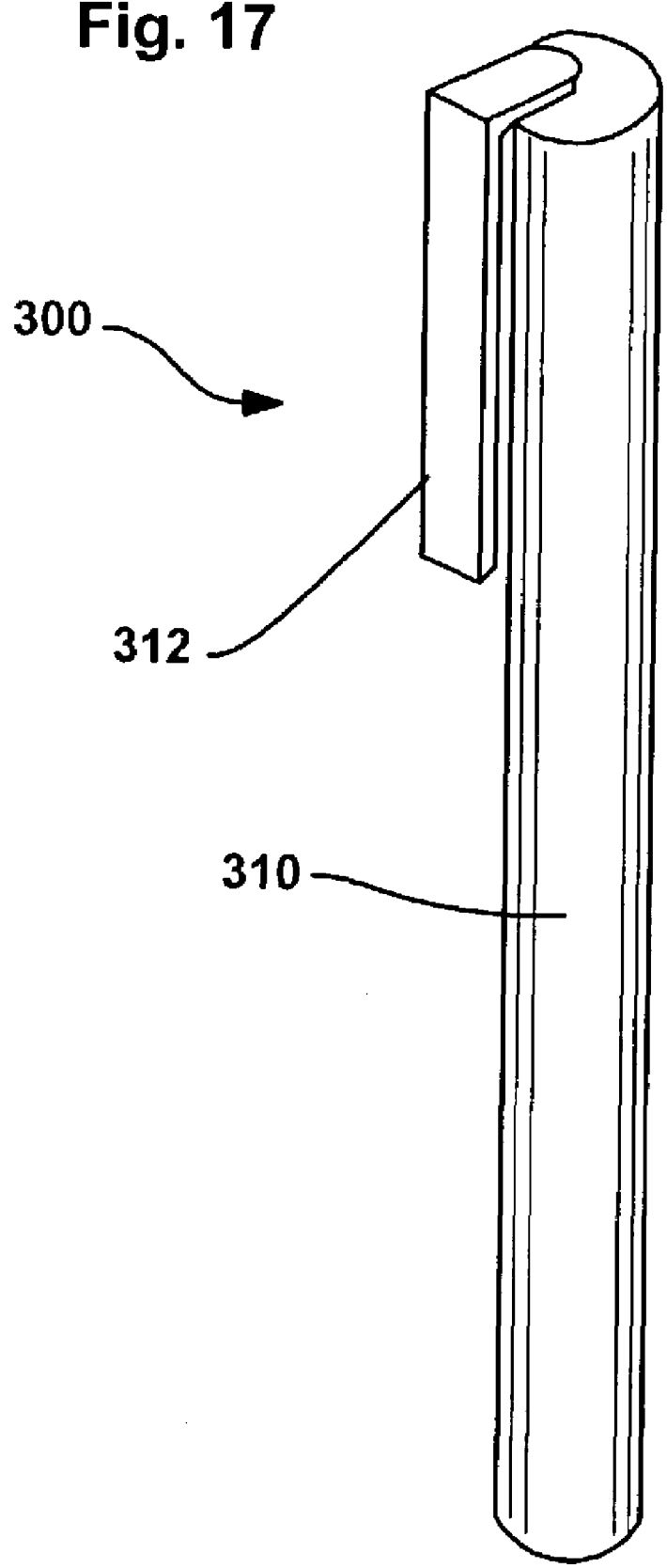
FIG. 17 is a perspective of a fourth exemplary wireless information device according to the present invention.

Referring now to FIG. 17 one additional simple WID embodiment 300 is illustrated. In FIG. 17, WID 30d is provided in a form that is similar to a pen having a rigid cylindrical housing member 310 and a clasp 312 that extends from one end toward the other end of housing member 310 along part of the length of member 310. Clasp 312 and member 310 cooperate to form a channel in which a shirt pocket or the like can be juxtaposed to secure WID 30d to an article of clothing. Referring also to FIG. 2a, WID 30d would include at least a processor 71, a memory 69 and a transmitter 67 and would be capable, despite its diminutive appearance, of cooperating with controller 38 to perform many of the functions described above.

Above, most of the inventive embodiments described use WID identity as one secondary criteria to be considered when determining how to regulate machine operations. Nevertheless, it should be appreciated that the present invention can also be useful in systems that restrict or regulate machine operations in the same fashion for all WIDs. To this end, a second exemplary AS 298 that may be used to regulate machine operations in the same fashion for all WIDs is illustrated in FIG. 18. Because machine regulation is not WID specific, AS 298 does not include a WID number column. AS 298 includes four separate columns including a machine zone column 300, an associated machines column 302, an authorized machine operations column 304 and a secondary criteria column 306 that comprises an operator limitation column akin to column 215 described above with respect to FIG. 13.

In operation, referring again to FIG. 3, the process steps of FIG. 3 are similar to the steps described above except that the AS is not WID specific and regulation is not WID specific. It should be noted here that where a wireless location determining system using multiple access points is employed, the WIDs must still transmit WID specific identifiers to controller 38 to enable WID location determination—this despite the fact that WID identity is not used specifically to select the ROS.

While the embodiments described above are described in the context of a system including access points and wireless communication therewith, it should be appreciated that other methods and systems exist for determining location of wireless devices and that many of the concepts described above may be performed with other device locating technology. For instance, infra-red device proximity sensors may be provided proximate machines and WID signal strength may be limited such that WID signals are only received by the proximity sensors when a WID is located within a machine zone. Other device location sensing technology is also contemplated.

While other device sensing technology is contemplated, it should nevertheless be recognized that access point type systems provide several advantages. For example, with access point type systems, machine zones can be altered by modifying software (e.g., a zone map stored in database 40). Similarly, new machine zones can be added to a map and existing zones can be deleted by modifying the software stored map. This zone altering ability is particularly useful in cases where a normally non-hazardous area of a facility is rendered temporarily hazardous for some reason. In this case, instead of shutting down an entire section of a facility proximate the temporarily hazardous area, the zone map may be altered to include a zone corresponding to the temporarily hazardous area wherein the controller either controls machines therein to eliminate the hazard when a WID is within the zone or to at least provides warnings to WID users entering the zone.

While most of the embodiments have been described above as ones where it is assumed that all facility users use WIDs and have the WIDs on themselves at all times, in many cases such assumptions may not be valid or, in some cases, WIDs may not be operating properly. Despite some facility personnel not using WIDs or attempting to use WIDs that do not work properly, machine regulation will still be required. Thus, in most embodiments of the invention, in addition to WID based regulation, a second level of regulation will be provided that is based at least in part on sensing presence of a facility user within a restricted location or machine zone.

Thus, for instance, in FIG. 1, controller 38 is linked to monitor 7 to determine when a user enters zone Z1m. As indicated above, monitor 7 may be a light curtain motion sensor or any other type of suitable presence sensor (e.g., a floor mounted pressure sensor, temperature sensor, etc.). Because zone Z1m is physically barriered no facility user can enter zone Z1m without being sensed by monitor 7.

Figure 19:
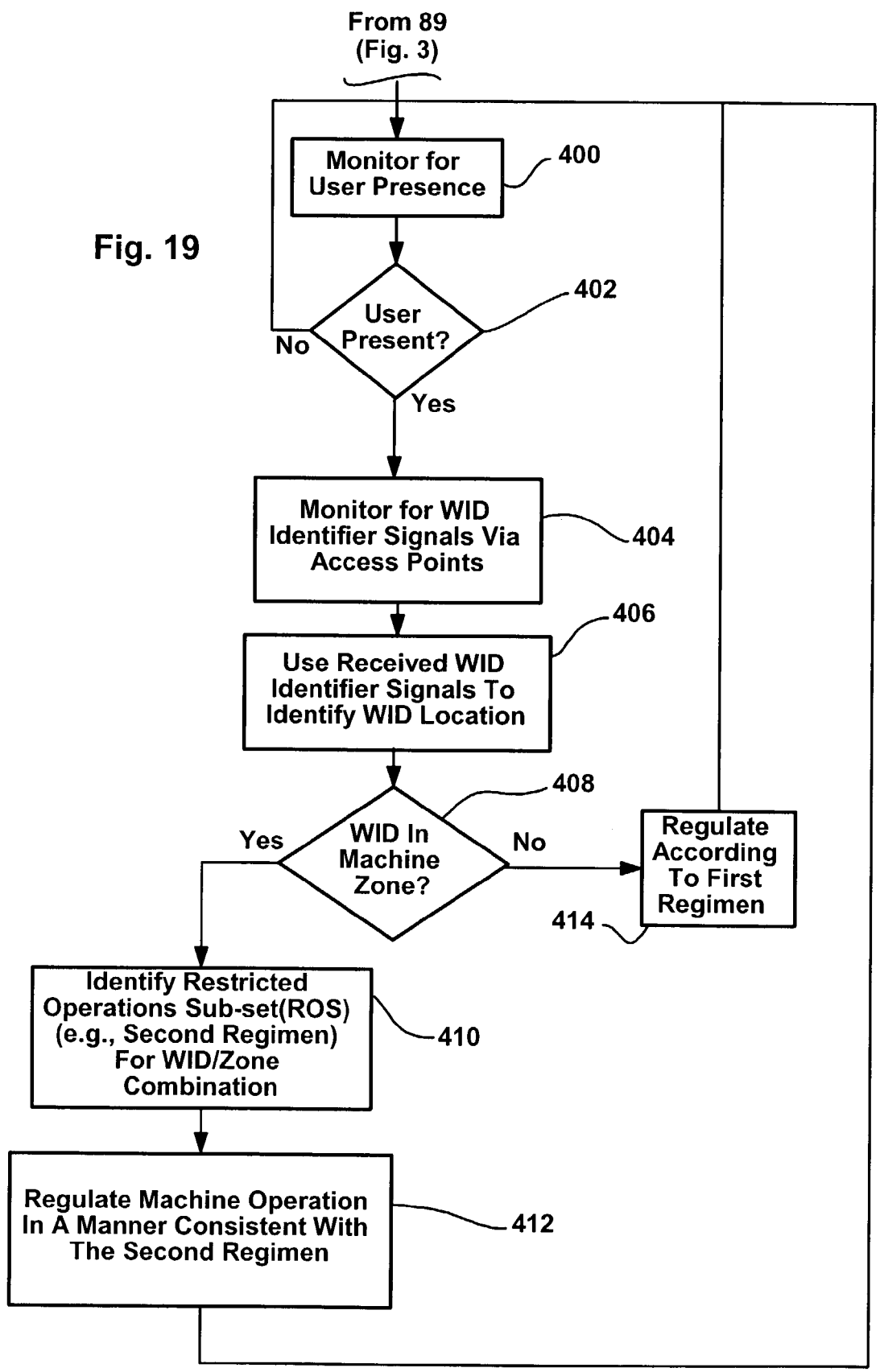
FIG. 19 is a flow chart illustrating one other sub-process that may be added to a section of the process of FIG. 3.

Combining the user monitors and the WID monitors (e.g., access points or the like) various additional control schemes are possible. For instance, referring now to FIG. 19, an exemplary sub-process which may be substituted for a portion of the method of FIG. 3 is illustrated. Referring also to FIGS. 1, 2a, 2c and 3, at block 400, controller 38 monitors for user presence within a machine zone or at a restricted location associated with a particular machine. At block 402, if there is no user present within a machine zone, control passes back up to block 400 where the loop including blocks 400 and 402 is repeated. If, at block 402, a user is present within a machine zone, control passes from block 402 to block 404.

At block 404, a user's WID transmits an identifier signal to the controller 38 via access points 11. At block 406 controller 38 uses the received signals to identify WID location. At block 408, controller 38 determines whether or not there is a WID within the machine zone in which the user was located at block 402. Where there is no WID within the machine zone in which a user was located at block 402, control passes to block 414 where controller 38 regulates machine operations according to a first relatively restricted regimen. For instance, in some embodiments, where a user is located within a machine zone but here is no WID located within the same machine zone, the first regimen will include halting all machine operations of machines associated with a particular machine zone. After block 414, control passes again back up to block 400 where the loop described above is repeated.

Referring again to block 408, where a WID is located within the machine zone in which a user was located at block 402, control passes from block 408 to block 410. At block 410, controller 38 identifies a second regimen for the WID/zone combination and at block 412 controller 38 regulates machine operation in a manner consistent with the second regimen. Here, the second regimen is typically less restrictive than the first regimen and may allow at least some machine operations to be performed.

Figure 20:
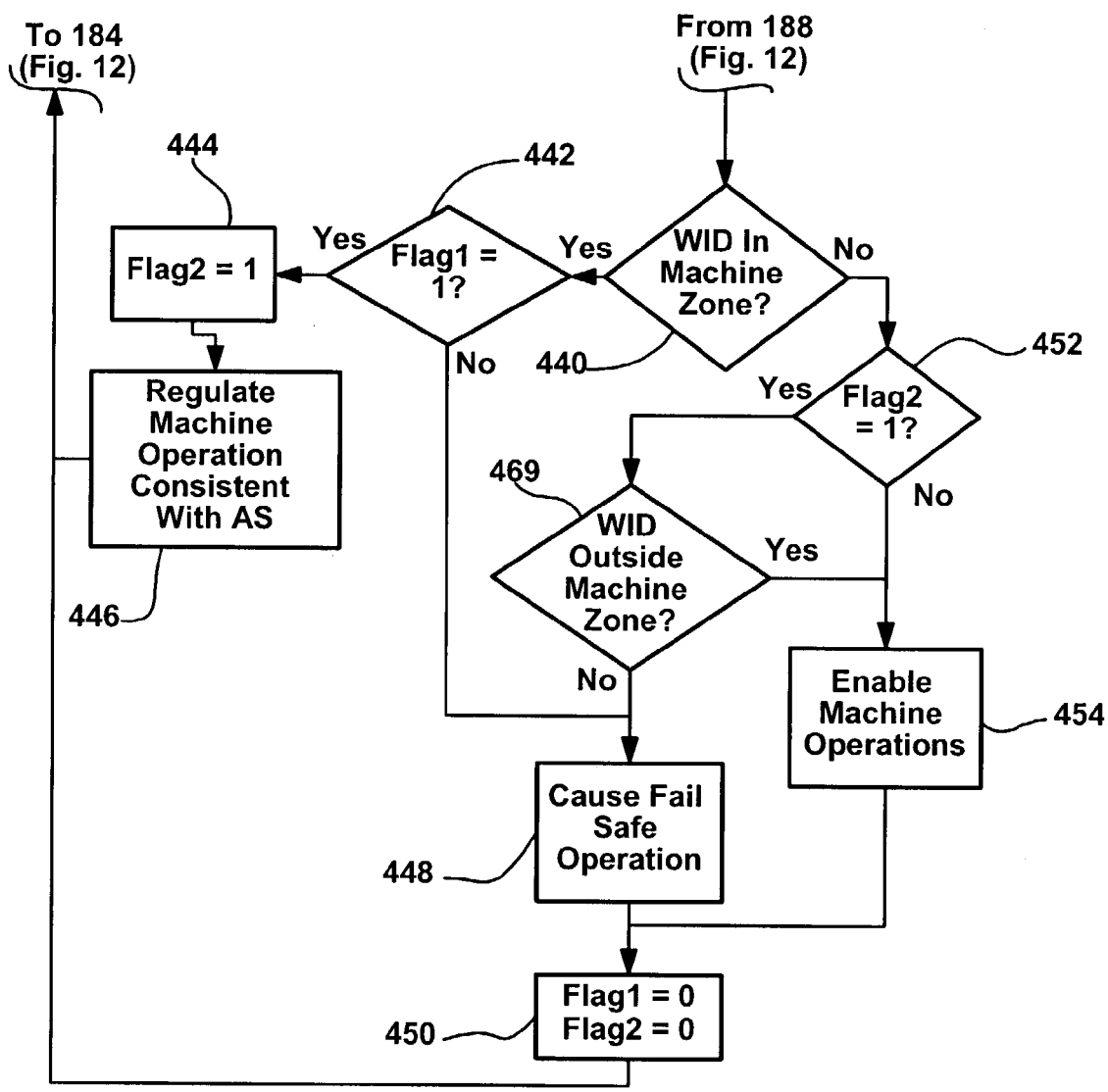
FIG. 20 is a sub-process flow chart that causes fail safe machine operation when communication with a WID in a restricted location ceases.

One other aspect of the invention causes machines to assume fail safe operating conditions when communication with a WID in a restricted location or zone ceases for any reason. To this end, another exemplary sub-process that can be used to supplement the process of FIG. 12 is illustrated in FIG. 20. Referring to FIGS. 12 and 20, after a WID has been enabled (i.e., Flag1=1) at block 192 and an AS for the machine zone/WID combination has been identified at block 214 in FIG. 12, control passes to block 440 in FIG. 20. At block 440 controller 38 determines if the WID is in a machine zone. Where a WID is in a zone control passes to block 442 and controller 38 determines if the WID is enabled by determining if Flag1 is 1.

Where the WID has been enabled control passes to block 444 and a second flag Flag2 is set equal to 1. Flag2 is a flag that is used to signal that an enabled WID has been in a machine zone so that during subsequent system cycles when the WID signal is lost or the WID is removed from the zone, machine operations can be altered in an appropriate fashion. After block 444 control passes to block 446 where machines are controlled in a manner consistent with the AS identified at block 214 (see again FIG. 12). Thereafter control passes back to block 184 in FIG. 12.

Referring again to block 442, if the WID in the zone is not enabled (e.g., Flag1=0), control passes to block 448 where the machines associated with the zone in which the WID resides are forced into fail safe operating modes. At block 450 each of flags Flag1 and Flag2 are reset to zero values and control passes back up to block 184 in FIG. 12.

Referring again to block 440, if controller 38 does to sense a WID present within the machine zone control passes to block 452 where controller 38 determines if Flag2 is 1. Where a WID was in the machine zone during the previous system cycle and was enabled, Flag2 will have a 1 value (see block 444) at block 452. Thus, where Flag2 is 1 at block 452 either one of two things must have occurred between the previous system cycle and the immediate cycle. First, the WID user may have physically removed the WID from the zone. Second, the WID may still be in the zone but communication with the WID may have been cut off for some reason (e.g., WID malfunction, access point malfunction, blocked signal between the WID and access points, disablement of the WID, etc.). In any event, where Flag2=1 (e.g., the WID was previously in the zone and enabled but now communication therewith inside the zone has ceased), control passes to block 469 where controller 38 determines if the WID is located outside the specific zone (e.g., within another machine zone or in the facility outside all machine zones).

Where the WID is not located outside the specific zone it is assumed that communication with the WID has been lost and control passes to block 448 where the machines associated with the zone are forced into fail safe operation.

Referring again to block 469, if controller 38 determines that the WID is outside the machine zone, in at least some embodiments of the invention, control passes to block 454 where the machines associated with the zone are controlled in a normal fashion (e.g., to perform an automated process). After block 454 control passes to block 450 where flags Flag1 and Flag2 are reset to zero values indicating that, at least with respect to the specific machine zone corresponding to the illustrated process, the particular WID is again disabled and that, during the most recent system cycle, the WID was not enabled and inside the machine zone. Again, control passes from block 450 back to block 184 in FIG. 12.

Referring again to block 452, if Flag2 is zero at block 452 indicating that the WID was not enabled and in the machine zone during the most recent system cycle control passes through blocks 454 and 450 where machines associated with the zones are controlled in a normal fashion and flags Flag1 and Flag2 are set to zero values before passing back to block 184 in FIG. 12.

Thus, generally, according to the sub-process of FIG. 20, when communication with a WID that was enabled and inside a machine zone during a previous system cycle ceases for any reason fail safe operation is assumed. In addition, in cases where communication continues outside the zone, machines are controlled to perform their typical automated processes.

In some embodiments, when a WID is removed from a zone between system cycles, it may be advantageous to require an affirmative indication from the WID user that normal machine operations should commence. For example, the operator may leave a tool within the zone that could cause damage to machine components during normal operations. A sub-process for seeking an affirmative indication is illustrated in FIG. 21. Referring also to FIG. 20, after a WID is located outside a machine zone at block 469 control passes to block 460 in FIG. 21 where controller 38 causes a query to be displayed via the WID requesting the WID operator to affirm that normal operations should commence. The query may also include appropriate selectable icons (e.g., "Yes" and "No" icons may suffice in certain applications).

At block 462, where an affirmative response is received control passes to block 454 in FIG. 20 where normal operations commence. Where a negative response is received control passes to block 446 in FIG. 20 where machines are regulated in a manner consistent with the AS.

In addition to the methods described above, other methods are contemplated. For instance, there may be more than two gradations of regulation premised upon various criteria. For instance, in another contemplated system the controller may determine whether or not a facility user is located within a machine zone and, if a user is located within a machine zone, may determine whether or not an operator like the operator illustrated in FIG. 9 above has been activated. Where an operator has been activated, controller 38 may determine if a WID is located within the machine zone in which the user is located. Where a WID is located within a machine zone, the operator is activated and a user is also located within the machine zone, the controller may regulate machine operations according to a third regimen which is relatively unrestricted. Where a user is within a machine zone, an operator is activated but there is no WID located within the machine zone, regulation may be according to a second regimen which is more regulated than the third regimen. In addition, where a user is located within a machine zone, but neither an operator is activated nor a WID is located within the machine zone, the controller may regulate machine operations according to a first regulated regimen where the first regulated regimen, as above, is more restrictive than the second or third regimens and, in at least some embodiments, would include halting machine operation.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. For example, where there are only two WID types used in a facility a controller may be programmed to seek a WID type identifier from only one of the WID types when a facility user is with a machine zone. Here, if the sought type of identifier is not obtained the controller may assume a WID of the second type (e.g., the type of WID that does not generate an identifier). As another example, circumstances described above as leading to halting of machine operations may, in some embodiments, lead to fail safe operations. For instance, when an operator is deactivated fail safe operation may commence. The disclosure is intended to cover by the appended claims all such modifications that fall within the scope of the claims.

To apprise the public of the scope of this invention, the following claims are made:

What is claimed is:

1. A method for controlling machine operation in an automated industrial facility including at least one machine, the method for regulating machine operations as a function of location of a wireless information device (WID), the method comprising the steps of:
   providing at least one WID;
   monitoring a location of at least one WID;
   determining if at least one WID is at a restricted facility location; and
   when at least one WID is at a restricted facility location, automatically changing a mode of operation of at least one machine.

2. The method of claim 1 further including the steps of monitoring for user presence at the restricted location and when only a user is present at the restricted location, automatically changing operation of the at least one machine from a normal mode of operation to a first reduced mode of operation and when both a user and a WID are present at the restricted location, automatically changing operation of the at least one machine to a second reduced mode of operation, wherein the first reduced mode of operation is more restrictive than the second reduced mode of operation.

3. The method of claim 2 wherein the first reduced mode of operation includes one of halting machine operations and causing machines to assume fail-safe operating modes.

4. The method of claim 3 wherein, when neither a user nor a WID is present at the restricted location after detecting at least one of the user and the WID at the restricted location, automatically returning the at least one machine to the normal mode of operation.

5. The method of claim 4 wherein the return to the normal mode of operation occurs upon detecting the absence of the user and the WID within the restricted location.

6. The method of claim 1 further including the step of associating at least one machine zone with at least one facility machine and wherein the step of determining if at least one WID is within a restricted facility location includes determining if at least one WID is within the at least one machine zone.

7. The method of claim 1 wherein the step of automatically changing the mode of operation includes regulating machine operation as a function of the specific WID located in the restricted location.

8. The method of claim 7 wherein the WIDs include first and second WID types, the first WID type including WIDs that have a first authorization clearance and the second type including WIDs that have a second authorization clearance, the first and second clearances associated with different sets of machine operations that may be performed when a WID having the clearance is within the restricted location, the step of automatically changing the mode of operation further including the step of determining the type of WID within the restricted location and automatically changing the mode of operation of the at least one machine as a function of the clearance associated with the identified WID type.

9. The method of claim 8 wherein WIDs of the first type include first type identifiers and, wherein the step of determining WID type includes attempting to obtain a first type identifier and, when a first type identifier is obtained, determining that the WID is of the first type, else, determining that the WID is of the second type.

10. The method of claim 9 wherein, when the WID type is the second type, the step of changing the mode of operation includes halting machine operations.

11. The method of claim 10 wherein the step of automatically changing the mode of operation further includes the step of indicating via the WID that machine operations have been changed.

12. The method of claim 7 wherein the step of automatically changing the mode of operation further includes the steps of obtaining information from the WID, using the obtained information to identify an authorization specification for the specific WID, the authorization specification specifying machine operations that can be performed when the WID is within each restricted location, and regulating machine operation in a manner consistent with the identified authorization specification.

13. The method of claim 12 further including the steps of providing a unique WID identifier in each WID, providing a database linked to a processor and separate from the WIDs, at least one authorization specification stored in the database and, wherein, the step of obtaining information includes obtaining the WID identifier stored in the WID that resides at the restricted location and the step of using including accessing the authorization specification stored in the database that is associated with the WID identifier.

14. The method of claim 13 wherein the step of providing the processor includes providing a processor capable of communicating with at least one machine for controlling machine operations and wherein the processor regulates machine operations as a function of the authorization specification.

15. The method of claim 14 wherein the step of providing at least one WID includes providing at least one WID with a transmitter and wherein the step of obtaining the WID identifier includes transmitting the WID identifier from the WID to the processor.

16. The method of claim 12 further including the steps of storing an authorization specification in each of the WIDs and wherein the step of obtaining includes obtaining an authorization specification from the WID located at the restricted location.

17. The method of claim 16 further including the steps of providing a processor capable of communicating with the at least one machine for controlling machine operations and wherein the step of obtaining includes transmitting at least a portion of the authorization specification from the WID to the processor.

18. The method of claim 7 further including the step of storing an authorization specification in each of the WIDs, each authorization specification specifying machine operations that can be performed when the associated WID is within each restricted location, providing a system processor linked to the at least one machine for controlling the at least one machine, transmitting a location identifier to the WID, accessing the authorization specification in the WID to identify a machine operations that can be performed when the WID is within the specific restricted location and transmitting an operations specification from the WID to the system processor, the system processor regulating machine operations as a function of the received operations specification.

19. The method of claim 6 further including the steps of providing an operator that may be activated by a facility user, when a WID is within a machine zone, monitoring operator activation and, when the operator is deactivated and the WID is in a machine zone, limiting operation of the machine associated with the zone.

20. The method of claim 19 wherein the step of limiting includes one of halting machine operation and causing machines to assume fail safe operating modes.

21. The method of claim 19 wherein the step of providing an operator includes providing an operator that is separate from the at least one WID.

22. The method of claim 19 wherein the step of providing an operator includes providing an operator as part of the WID.

23. The method of claim 22 further including the steps of enabling at least one WID, when a WID is located within a machine zone, determining if the WID is enabled and, when the WID is enabled, regulating machine operations as a function of the specific WID within the machine zone, else, halting machine operation.

24. The method of claim 23 further including the steps of, after the WID is enabled, monitoring physical proximity of the WID to a WID user and, when the WID is outside a proximity range of the WID user, disabling the WID.

25. The method of claim 24 wherein the step of determining if the WID is enabled includes periodically determining if the WID is enabled and, if the WID becomes disabled, further regulating machine operations.

26. The method of claim 25 wherein the step of further regulating includes one of halting machine operations and causing machines to assume fail safe operating modes.

27. The method of claim 23 wherein the step of enabling at least one WID includes the steps of obtaining user information from the WID user that uniquely identifies the user and storing the user information in the WID.

28. The method of claim 27 wherein the step of obtaining user information includes identifying biometric indicia of the user.

29. The method of claim 23 wherein the step of enabling at least one WID includes the steps of storing biometric indicia of authorized facility users, identifying biometric indicia of a facility user, comparing the user's biometric indicia to the stored indicia and, where the user's indicia matches at least one of the stored indicia, enabling the WID.

30. The method of claim 21 further including the steps of enabling at least one WID, when a WID is located within a zone, determining if the WID is enabled and, when the WID is enabled, regulating the machine as a function of the specific WID within the machine zone, else, halting machine operation.

31. The method of claim 30 further including the steps of, after the WID is enabled, monitoring physical proximity of the WID to a WID user and, when the WID is outside a proximity range of the WID user, disabling the WID and, wherein the step of enabling at least one WID includes the steps of obtaining user information from the WID user that uniquely identifies the user and storing the user information in the WID.

32. The method of claim 1 further including the steps of enabling at least one WID, when a WID is located at a restricted location, determining if the WID is enabled and, when the WID is enabled, automatically changing a mode of operation of the at least one machine to a reduced mode of operation.

33. The method of claim 32 further including the steps of, after the WID is enabled, monitoring physical proximity of the WID to a WID user and, when the WID is outside a proximity range of the WID user, disabling the WID.

34. The method of claim 33 wherein the step of monitoring physical proximity includes the steps of providing a user proximity sensor on the WID and using the WID to monitor user proximity.

35. The method of claim 34 wherein the step of providing a proximity sensor includes providing a capacitive coupling sensor.

36. The method of claim 32 wherein the step of enabling at least one WID includes the steps of obtaining user information from the WID user that uniquely identifies the user and storing the user information in the WID.

37. The method of claim 36 wherein the step of obtaining user information includes identifying biometric indicia of the user.

38. The method of claim 37 wherein the step of identifying biometric indicia includes the step of providing at least one of a thumb print reader, an eye scanner and a voice recognition sensor as part of the WID.

39. The method of claim 6 wherein, for at least one machine there are at least first and second different machine zones and wherein the step of automatically changing a mode of operation of the at least one machine includes regulating machine operation differently depending on which of the first and second zones the WID is located in.

40. The method of claim 39 wherein the first zone is inside the second zone and is more proximate the at least one machine than the second zone, the step of automatically changing a mode of operation of the at least one machine includes allowing more machine operations to be performed when the WID is in the second zone than when the WID is in the first zone.

41. The method of claim 6 wherein the step of automatically changing a mode of operation of the at least one machine includes changing a mode of operation of the at least one machine as a function of WID location within the machine zone and wherein the step of determining if a WID is within the machine zone includes determining the location of the WID within the machine zone.

42. The method of claim 41 wherein the step of automatically changing a mode of operation of the at least one machine includes regulating machine operations in one of several different ways as a function of WID location.

43. The method of claim 1 further including the step of using past WID location information to predict a future WID location and automatically changing a mode of operation of the at least one machine as a function of the predicted future WID location.

44. The method of claim 43 wherein the step of using past WID location information includes storing machine location information, using the stored machine information to determine current direction of WID travel and current travel rate and using the current direction and current rate information to predict future WID location.

45. The method of claim 1 wherein the step of determining if the WID is located at a restricted location includes the steps of providing wireless access points within the facility and transmitting signals from one of the WID and the access points to the other of the WID and the access points and using the received signals to determine WID location.

46. The method of claim 1 wherein machine operations include machine cycles and wherein the step of automatically changing a mode of operation of the at least one machine includes the steps of monitoring machine cycles and regulating machine operation as a function of both WID location and the extent of machine cycle completion.

47. The method of claim 1 further including the step of providing at least a second WID, the step of determining if a WID is at a restricted location includes determining if the first WID is at a restricted location and the method further includes the step of, when the first WID is located at a restricted location, determining the location of the second WID and, the step of automatically changing a mode of operation of the at least one machine includes regulating machine operation as a function of the second WID location.

48. The method of claim 47 further including the step of associating at least one machine zone with at least one machine and, wherein, the step of determining if at least one WID is at a restricted location includes the step of determining if the first WID is within the at least one machine zone and the step of determining the location of the second WID includes determining if the second WID is within the at least one machine zone.

49. The method of claim 48 wherein the step of automatically changing a mode of operation of the at least one machine as a function of the second WID location includes halting operations of machines associated with the machine zone when the second WID is within the machine zone.

50. A method for use in an automated industrial facility including at least one machine, the method for controlling machine operations as a function of location of a facility user, the method comprising the steps of:
  specifying at least one restricted location associated with the at least one machine;
  providing at least one wireless information device (WID);
  monitoring for facility user presence at the at least one restricted location;
  monitoring for WID presence at the at least one restricted location;
  controlling machine operations according to a first regimen when only a user is present at the restricted location;
  controlling machine operations according to a second regimen when both a user and a WID are present at the restricted location, wherein the first and second regimens are different; and
  wherein changes in operation between at least the first regimen and the second regimen occur automatically based on the monitored user location and the monitored WID location.

51. The method of claim 50 wherein the first regimen is more restrictive than the second regimen.

52. The method of claim 50 wherein the step of monitoring WID presence includes the steps of providing wireless access points within the facility, transmitting signals from one of the WID and the access points to the other of the WID and the access points and using the received signals to determine WID location within the facility.

53. The method of claim 52 wherein the step of monitoring user presence includes the step of providing at least one of a motion sensor, a light sensor, a pressure sensor and a thermal sensor.

54. The method of claim 53 wherein the step of monitoring for user presence further includes the step of physically restricting access to the restricted location to along access paths and using the at least one sensor to identify movement along any of the access paths.

55. The method of claim 50 wherein the step of specifying at least one restricted facility location includes the step of specifying at least one machine zone associated with the at least one machine and wherein the step of monitoring for WID presence includes monitoring for WID presence anywhere within the machine zone.

56. The method of claim 55 wherein the step of monitoring for user presence includes monitoring for user presence anywhere within the machine zone.

57. The method of claim 55 further including the step of, when a WID is present in the machine zone, tracking WID location within the machine zone.

58. The method of claim 57 further including the steps of altering machine operations as a function of WID location within the machine zone.

59. A system for controlling machine operation in an automated industrial facility comprising:
  at least one machine and at least one machine zone associated with the machine;
  a wireless information device (WID) associated with a facility user;
  an operator device; and
  a processor linked to the at least one machine for controlling operations of the at least one machine, the processor configured to automatically:
  (a) determine if a facility user is located within the machine zone;
  (b) if a user is located within the machine zone, determine if the operator device is activated, else regulating operation of the at least one machine according to a first regimen;
  (c) if the operator is activated, determine if a WID is located within the machine zone, else regulating operation of the at least one machine according to a second regimen;
  (d) if a WID is located within the machine zone:
    (i) regulate machine operations according to a third regimen; and
    (ii) repeat steps (a) through (d).

60. The system of claim 59 wherein the first regulating regimen includes halting operation of the at least one machine.

61. The system of claim 60 wherein, to determine if a user is within the machine zone, the processor is further configured to restrict access to the machine zone to at least one zone access path and further comprising a sensor within each of the zone access paths configured to identify user passage therethrough and provide feedback to the processor.

62. The system of claim 61 wherein, to regulate machine operations according to the third regimen, the processor is further configured to identify at least one characteristic of the WID within the machine zone and regulate machine operations as a function of the identified WID characteristic.

63. The system of claim 62 wherein, to identify at least one characteristic of the WID, the processor is further configured to identify the specific WID within the machine zone.

64. The system of claim 59 wherein the processor is further caused to enable at least one WID and, wherein, to regulate according to a third regimen, the processor is caused to determine if the WID in the machine zone is enabled and, where the WID is enabled, the processor is caused to regulate machine operations according to a second protocol, else regulate machine operations according to a first protocol.

65. The system of claim 64 wherein the first protocol is more restrictive than the second protocol.

66. The system of claim 65 wherein regulating according to a first protocol includes halting machine operations.

67. The system of claim 59 wherein, to regulate operation of the at least one machine according to the third regimen includes regulating operation of the at least one machine as a function of WID location within the machine zone.

68. The system of claim 59 wherein the machine operations include machine cycles and wherein the processor is further caused to regulate operations according to the third regimen by regulating operations as a function of the extent of machine cycle completion.

69. A system for controlling machine operation in an automated industrial facility comprising:
   at least one machine that performs machine operations including machine cycles;
   a wireless information device (WID) associated with a facility user;
   a controller in communication with the WID and the at least one machine and configured to:
   identify at least one restricted facility location associated with at least one machine;
   determine if the WID is within a restricted facility location;
   where the WID is within a restricted facility location automatically:
   (i) identify the extent of machine cycle completion of the at least one machine; and
   (ii) regulate operation of at least one machine as a function of the extent of machine cycle completion.

70. The system of claim 69 wherein the controller is further configured to identify at least one machine zone associated with the at least one machine and including the at least one restricted location and wherein, to determine if the WID is located within a restricted location, the controller is configured to determine if the WID is located within the machine zone.

71. The system of claim 70 wherein the controller is further caused to determine the location of the WID within the machine zone.

72. The system of claim 71 wherein, to regulate operations, the controller is further configured to regulate operations as a function of both the extent of machine cycle completion and WID location within the machine zone.

73. A system for controlling machine operation in an automated industrial facility comprising:
   at least one machine;
   a wireless information device (WID);
   a controller in communication with the at least one machine and the WID and configured to automatically:
   monitor a location of the WID within the facility;
   predict a future location of the WID within the facility; and
   regulate operation of the at least one machine as a function of the predicted WID location.

74. The system of claim 73 wherein, to predict a future location, the controller is further configured to periodically determining WID location, store WID location information, and, using the stored WID location information, predict a future WID location.

75. The system of claim 74 wherein, to use the stored location information, the controller is further configured to use the stored location information to determine a current travel direction and a current travel rate and combine the current direction and current rate information to predict the future location.

76. The system of claim 73 wherein the controller is further configured to identify at least one restricted location within the facility and determine if the predicted location includes the restricted location and, if the predicted location includes the restricted location, regulate operation of the at least one machine according to a first regimen, else regulate operation of the at least one machine according to a second regimen.

77. A controller for controlling machine operation in an automated industrial facility including at least one machine, the controller configured to:
   (a) automatically identify at least one machine zone associated with at least one facility machine;
   (b) automatically monitor at least first and second wireless information devices (WIDs);
   (c) automatically determine if the first and second WIDs are located within the machine zone;
   (d) when both the first and second WIDs are located within the machine zone, automatically regulate machine operations according to a first regimen; and
   (e) when only the first WID is located in the machine zone, automatically regulate machine operation according to a second regimen that is different than the first regimen.

78. The system of claim 77 wherein the first regimen is more restrictive than the second regimen.

79. The system of claim 78 wherein the first regimen includes causing the machine to assume a safe operating condition.

80. The system of claim 77 wherein, when only the second WID is located in the machine zone, the controller is configured to regulate the machine according to a third regimen that is different than each of the first and second regimens.

81. The system of claim 77 wherein the controller is configured to repeat (c), (d) and (e).

82. A system for controlling machine operation in an automated industrial facility comprising:
   at least one machine and at least one associated machine zone;
   a controller configured to restrict machine operation as a function of juxtaposition of a facility user with respect to the at least one machine by performing the steps of:
   determining if a facility user is within the at least one machine zone;
   where a user is within the machine zone, determining user location within the machine zone; and
   automatically adjusting operation of the at least one machine as a function of user location within the at least one machine zone.

83. The system of claim 82 wherein the step of adjusting includes the steps of determining the user's identity and changing machine operation as a function of the user's identity.

84. The system of claim 82 wherein the step of adjusting includes regulating operation of the at least one machine according to a second regimen and, wherein the controller is further configured to perform the steps of determining if a second facility user is within the machine zone and, where a second user is located within the machine zone, regulating machine operation operations according to a first regimen that is more restrictive than the second regimen.

85. The system of claim 82 further comprising an operator that is associated with the at least one machine and, wherein, the controller is further configured to perform the steps of, when a user is located within the machine zone, monitoring for activation of the operator, and the step of adjusting including operation includes the steps of, where the operator is activated, regulating machine operations according to a second regimen and, where the operator is not activated, regulating machine operations according to a first regimen.

86. The system of claim 85 wherein the step of adjusting according to a first regimen includes halting machine operations.

87. The system of claim 82 wherein the step of determining if a user is within the machine zone includes the step of monitoring a wireless information device (WID) associated with the user and monitoring the machine zone for presence of the WID.

88. A system for controlling machine operations in an automated industrial facility including at least one machine, the system for controlling machine operations as a function of the location of facility users, the system comprising:
at least one wireless information device (WID);
a monitor for obtaining information usable to determine if at least one WID is at a restricted facility location; and
a controller linked to the monitor and also to the at least one machine, the controller receiving the information from the monitor and determining if the at least one WID is at the restricted location and automatically changing operations of the machine associated with the restricted location when the WID is at the restricted location.

89. The system of claim 88 wherein the monitor is a first monitor and the system further includes a second monitor for obtaining information useable to determine if a user is present at the restricted location, the controller receiving information from the second monitor and using the information from the second monitor to determine if a user is present at the restricted location and wherein, when only a user is present at the restricted location, the controller regulates machine operation according to a first regimen and when both a user and a WID are present at the restricted location, the controller automatically regulates machine operation according to a second regimen that is less restrictive than the first regimen.

90. The system of claim 89 wherein the first regimen includes one of halting machine operations and causing the machine to assume a fail safe operating mode.

91. The system of claim 90 wherein, when neither a user nor a WID is present at the restricted location the controller regulates the machine to perform a first set of operations and wherein the second regimen includes a second set of operations that is a sub-set of the first set of operations.

92. The system of claim 88 wherein at least one machine zone is associated with at least one facility machine and wherein the controller determines if at least one WID is within the at least one machine zone.

93. The system of claim 88 wherein the controller identifies at least one characteristic of a WID present at the restricted location and regulates operations as a function of both the identified WID characteristic and the WID location.

94. The system of claim 93 wherein the characteristic includes WID type.

95. The system of claim 93 wherein the characteristic includes specific identity of the WID.

96. The system of claim 95 wherein the at least one WID includes a WID identifier and wherein the controller obtains the WID identifier via the monitor.

97. The system of claim 96 wherein the WID includes a transmitter and the monitor includes a receiver linked to the controller and wherein the transmitter transmits WID identifier signals to the controller via the receiver.

98. The system of claim 93 wherein the WID may be enabled and wherein the controller identifies whether or not the WID is enabled.

99. The system of claim 92 further including an operator activatable by a facility user when the user is in a machine zone and wherein the controller monitors operator activation and, when the operator is deactivated and a WID is located within the machine zone, limits machine operations.

100. The system of claim 99 wherein the operator is separate from the at least one WID.

101. The system of claim 99 wherein the operator is part of the WID.

102. The system of claim 93 wherein the WID may be enabled by a user and wherein the characteristic includes enablement, the controller controlling machine operations according to a second regimen when the WID is enabled and otherwise controlling machine operations according to a first regimen that is more limited than the second regimen.

103. The system of claim 102 wherein the at least one WID further includes a proximity sensor for monitoring proximity of the WID to a user after the WID is enabled and, wherein, the proximity sensor disables the WID when the WID is removed from proximity of a user.

104. The system of claim 103 wherein the proximity sensor includes a capacitive coupling sensor.

105. The system of claim 102 further including an input device for receiving user information useable to enable the at least one WID.

106. The system of claim 105 wherein the input device is a biometric indicia reader.

107. The system of claim 106 wherein the WID includes the reader.

108. The system of claim 106 wherein the reader includes at least one of a thumb print reader, an eye scanner and a voice recognition sensor.

109. The system of claim 92 wherein the controller tracks WID location within the machine zone and regulates machine operations as a function of WID location within the machine zone.

110. The system of claim 109 wherein, for at least one machine there are at least first and second different machine zones and wherein the controller determines if the WID is within the first or the second zone and regulates machine operations according to a first regimen when the WID is within the first zone and according to a second regimen when the WID is within the second zone.

111. The system of claim 110 wherein the first zone is inside the second zone and is more proximate the machine than the second zone and wherein the first regimen is more restrictive than the second regimen.

112. The system of claim 93 wherein the characteristic includes predicted future WID location and wherein the controller uses past WID location information to predict future WID location.

113. The system of claim 112 wherein the controller stores machine location information, uses the stored information to determine current direction of WID travel and current travel rate and uses the current direction and current rate information to predict future WID location.

114. The system of claim 88 wherein the at least one WID includes a transmitter and the monitor includes wireless access points linked to the controller and, wherein, the transmitter transmits at least some signals to the access points that are used by the controller to determine WID location.

115. The system of claim 93 wherein machine operations include machine cycles, the characteristic includes the extent of cycle completion and wherein the controller monitors machine cycles.

116. The system of claim 88 further including at least a second WID, the monitor also obtaining information useable to determine if the at least second WID is at the restricted facility location and the controller regulating operation of the at least one machine associated with the restricted location differently when more than one of the WIDs are at the restricted location at he same time.

117. An system for use in an industrial automation facility including at least one machine, the system for controlling machine operation as a function of location of a facility user, the system comprising:
- at least one wireless information device (WID);
- a first monitor for obtaining information useable to determine if a user is present at a restricted facility location;
- a second monitor for obtaining information useable to determine if at least one WID is at a restricted facility location;
- a controller linked to the at least one machine and also linked to the first and second monitors, the controller using information from the first and second monitors to determine if a user and a WID are present at the restricted location, respectively;
- wherein the controller is configured to automatically change machine operations from a normal operational mode to a first regimen when only a user is present at the restricted location and change machine operations from the normal operational mode to a second regimen when both a user and a WID are present at the restricted location; and
- wherein the first regimen is more restrictive than the second regimen.

118. The system of claim 117 wherein the second monitor includes wireless access points within the facility that are linked to the controller, the WID includes a transmitter that transmits signals from the WID to the access points.

119. The system of claim 118 wherein the first monitor includes at least one of a motion sensor, a light sensor, a pressure sensor and a thermal sensor.

120. The system of claim 117 wherein the restricted location includes a machine zone and the controller tracks WID location within the machine zone.

121. The system of claim 120 wherein the controller alters machine operations as a function of WID location within the machine zone.

122. A system for controlling machine operations in an automated industrial facility including at least one machine and at least one machine zone associated with the machine, the system for restricting machine operation when a wireless information device (WID) associated with a facility user is within the machine zone, the system comprising:
- at least one WID;
- an operator device that may be activated by a system user;
- a first monitor for obtaining information for determining if a user is present in the at least one machine zone;
- a second monitor for obtaining information for determining if a WID is present within the at least one machine zone;
- a controller linked to the machine for controlling machine operations and linked to the first and second monitors and to the operator, the controller programmed to carry out a plurality of steps automatically, the plurality of steps including:
  - (a) determining if a user is located in the machine zone;
  - (b) if a user is located within the machine zone, determining if the operator is activated;
  - (c) if the operator is activated, determining if a WID is located within the machine zone;
  - (d) if a WID is located within the machine zone:
    - (i) regulating machine operations according to a third regimen; and
    - (ii) repeating steps (a) through (d); else regulating machine operations according to a second regimen; else regulating machine operations according to a first regimen.

123. The system of claim 122 wherein the first regulating regimen includes halting machine operations.

124. The method of claim 122 wherein the controller regulates machine operations according to the third regimen by identifying at least one characteristic of the WID within the machine zone and regulating machine operations as a function of the identified WID characteristic.

125. The system of claim 124 wherein the characteristic includes WID identity and the second monitor receives information from the WID useable to identify the specific WID.

126. The system of claim 122 wherein the WID may be enabled by a user and wherein the controller regulates according to a third regimen by determining if the WID in the machine zone is enabled and, where the WID is enabled, regulating machine operations according to a second protocol, else regulating machine operations according to a first protocol wherein the first protocol is more restrictive than the second protocol.

127. A system for controlling machine operation in an automated industrial facility including at least one machine and an associated machine zone, the system comprising:
- at least first and second wireless information devices (WIDs);
- a monitor for obtaining information useable to determine when each of the first and second WIDs is located within the machine zone;
- a controller for receiving the monitor information and determining when each of the first and second WIDs is within the machine zone, when both the first and second WIDs are located within the machine zone, automatically regulating machine operations according to a first regimen without prompting and when only the first WID is located in the machine zone, automatically regulating machine operations according to a second regimen that is less restrictive than the first regimen without prompting.

128. The system of claim 127 wherein the controller further, when only the second WID is located in the machine zone, regulates the machine according to a third regimen without prompting that is different than each of the first and second regimens.

129. A system for controlling machine operations in an automated industrial facility including at least one machine, the system for controlling machine operations as a function of the location of facility users, the system comprising:
- at least one wireless information device (WID);
- a plurality of monitors configured to determine if the at least one WID is at a restricted facility location;
- a controller linked to the monitor to receive location feedback indicating a current location of the at least one WID and control operation of the at least one machine without prompting based on the location feedback from the plurality of monitors to:
  - (i) automatically reduce operation of the at least one machine to a first reduced operational mode when the at least one WID enters the restricted facility location;
  - (ii) automatically reduce operation of the at least one machine to a second reduced operational mode that is a subset of the first reduced operational mode when the at least one WID enters a predetermined proximity of the at least one machine within the restricted facility location; and (iii) automatically disable the at least one machine when the at least one WID enters another predetermined proximity of the at least one machine within the predetermined proximity.

130. The system of claim 129 wherein the controller is further configured to store machine location information and, using the stored machine information, determine a current direction of at least one WID travel and current travel rate within the automated industrial facility using the location feedback indicating the current location of the at least one WID from the plurality of monitors and, using the current direction and current rate information, predict a future location of the at least one WID.

131. The system of claim 130 wherein the controller is further configured to automatically change the operational mode of the at least one machine to one of the first reduced operational mode, the second reduced operational mode, and disabled upon determining a future location of the at least one WID that is located in at least one of the restricted facility location, the predetermined proximity of the at least one machine within the restricted facility location, and the another predetermined proximity of the at least one machine within the predetermined proximity.

* * * * *